US012568528B2

(12) United States Patent
Yang et al.

(10) Patent No.: US 12,568,528 B2
(45) Date of Patent: Mar. 3, 2026

(54) CHANNEL ACCESS PROCEDURE

(71) Applicant: ZTE Corporation, Shenzhen (CN)

(72) Inventors: Ling Yang, Shenzhen (CN); Li Tian, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 482 days.

(21) Appl. No.: 18/069,109

(22) Filed: Dec. 20, 2022

(65) Prior Publication Data

US 2023/0126765 A1 Apr. 27, 2023

Related U.S. Application Data

(63) Continuation of application No. PCT/CN2020/107954, filed on Aug. 7, 2020.

(51) Int. Cl.
*H04W 74/0808* (2024.01)
*H04B 7/0408* (2017.01)

(52) U.S. Cl.
CPC ...... *H04W 74/0808* (2013.01); *H04B 7/0408* (2013.01)

(58) Field of Classification Search
None
See application file for complete search history.

(56) References Cited

U.S. PATENT DOCUMENTS

2017/0303136 A1 10/2017 Park et al.
2017/0318489 A1 11/2017 Sun et al.

| | | | | |
|---|---|---|---|---|
| 2019/0230706 | A1 | 7/2019 | Li et al. | |
| 2019/0373635 | A1 | 12/2019 | Yang et al. | |
| 2020/0053777 | A1 | 2/2020 | Babaei et al. | |
| 2020/0383136 | A1 | 12/2020 | Xie et al. | |
| 2021/0029740 | A1* | 1/2021 | Yerramalli | H04B 7/0695 |
| 2022/0272753 | A1* | 8/2022 | Hakola | H04B 7/0617 |
| 2023/0209597 | A1* | 6/2023 | Salim | H04W 74/0808 |
| | | | | 370/329 |

FOREIGN PATENT DOCUMENTS

| CN | 107888256 A | 4/2018 |
|---|---|---|
| CN | 109845383 A | 6/2019 |
| CN | 110213804 A | 9/2019 |

(Continued)

OTHER PUBLICATIONS

Hearing Notice for Indian Patent Application No. 202247035860, mailed Mar. 25, 2025 (4 pages).

(Continued)

*Primary Examiner* — Anh Vu H Ly
(74) *Attorney, Agent, or Firm* — Perkins Coie LLP

(57) ABSTRACT

Disclosed are devices, systems and methods for channel access procedures that include a listen-before-talk (LBT) rule for preventing a mismatch between a sensing beam and a transmission beam. In some implementations, a data communication method includes detecting an idle channel by performing, by a communication node, an energy detection operation based on at least one of a transmission beam or a reception beam, and transmitting, upon detection of the idle channel in at least one of the transmission beam or the reception beam, messages through the transmission beam corresponding to the idle channel.

15 Claims, 22 Drawing Sheets

1500

Detect an idle channel by performing, by a communication node, an energy detection operation based on at least one of a transmission beam or a reception beam — 1510

Transmit, upon detection of the idle channel in at least one of the transmission beam or the reception beam, messages through the transmission beam corresponding to the idle channel — 1520

(56)                References Cited

FOREIGN PATENT DOCUMENTS

| CN | 110536432 | A | 12/2019 |
| EP | 3637918 | A1 | 4/2020 |
| JP | 2014116661 | A | 6/2014 |
| KR | 10-2020-0021452 | | 2/2020 |
| WO | 2019160741 | A1 | 8/2019 |

OTHER PUBLICATIONS

Office Action for Chinese Patent Application No. 202080104091.7, mailed Aug. 1, 2024 (36 pages).

LG Electronics, "Considerations on channel access mechanism to support NR above 52.6 Ghz," 3GPP TSG RAN WG1 #101, R1-2004039, e-Meeting, May 25-Jun. 5, 2020 (5 pages).

Qualcomm Incorporated, "Channel access mechanism for NR in 52.6 to 71GHz band," 3GPP TSG RAN WG1 Meeting #101-e, R1-2004489, e-Meeting, May 25-Jun. 5, 2020 (9 pages).

Office Action for Japanese Patent Application No. 2022-540384, mailed Oct. 10, 2023, with English summary (7 pages).

ZTE Corporation et al., "Discussion on the channel access mechanism for above 52.6GHz," 3GPP TSG RAN WG1 #101, e-Meeting, R1-2003462, 5 pages, May 25-Jun. 5, 2020.

International Search Report and Written Opinion for International Application No. PCT/CN2020/107954, mailed May 11, 2021 (9 pages).

Extended European Search Report for European Patent Application No. 20948132.4, mailed Jun. 27, 2023 (13 pages).

Examination Report for Indian Patent Application No. 202247035860, mailed Dec. 27, 2023 (10 pages).

Office Action from Korean Patent Application No. 10-2022-7022088 dated Jun. 20, 2025 with English summary (5 pages).

* cited by examiner

Figure 15:
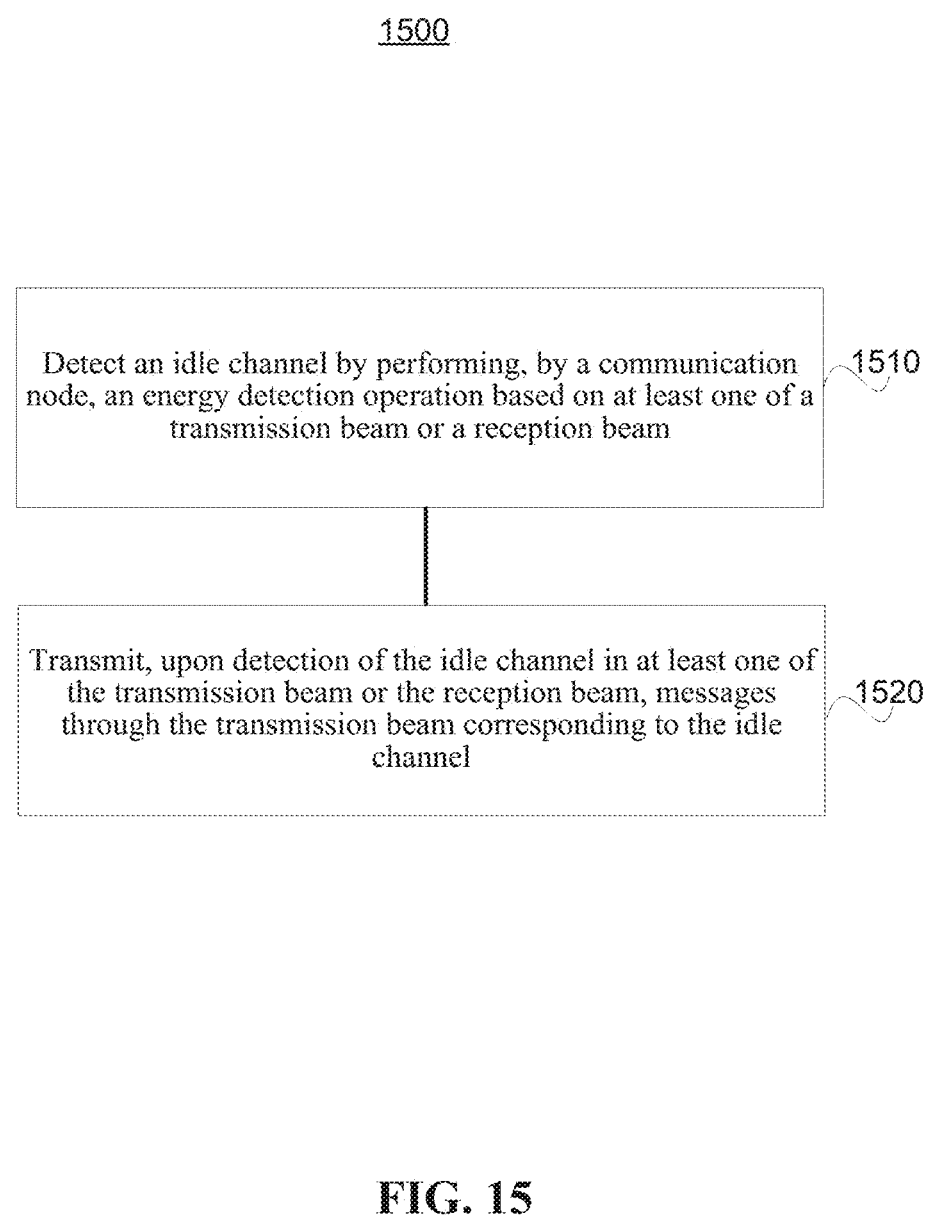

1500

Detect an idle channel by performing, by a communication node, an energy detection operation based on at least one of a transmission beam or a reception beam ~1510

Transmit, upon detection of the idle channel in at least one of the transmission beam or the reception beam, messages through the transmission beam corresponding to the idle channel ~1520

Perform a listen-before-talk operation before a transmission
in a plurality of beam directions        1610

Perform a transmission over each of the plurality of beam
directions during a channel occupancy time        1620

Figure 17:
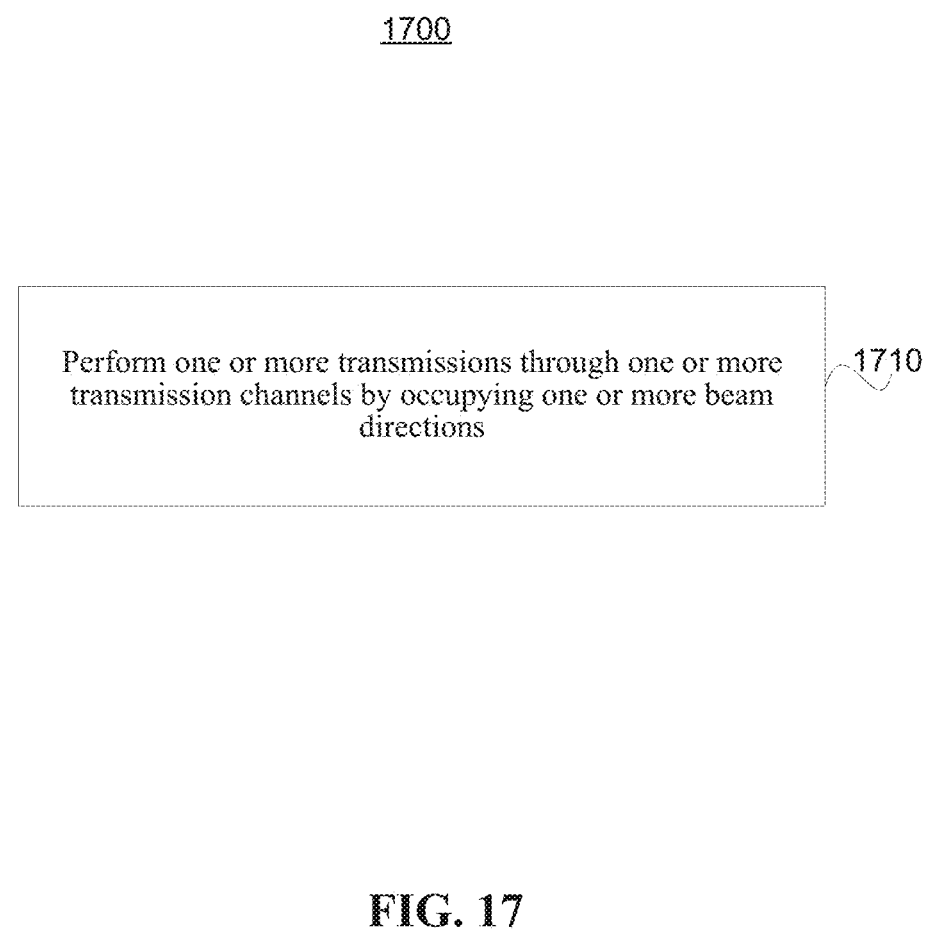

1700

Perform one or more transmissions through one or more
transmission channels by occupying one or more beam
directions                                    1710

Obtain, the communication node, a listen-before-talk operation information

1810

Perform one or more listen-before-talk operations on the one or more beam directions

1820

Perform the one or more transmissions based on a result of the one or more listen-before-talk operations on the one or more beam directions

1830

Figure 19:
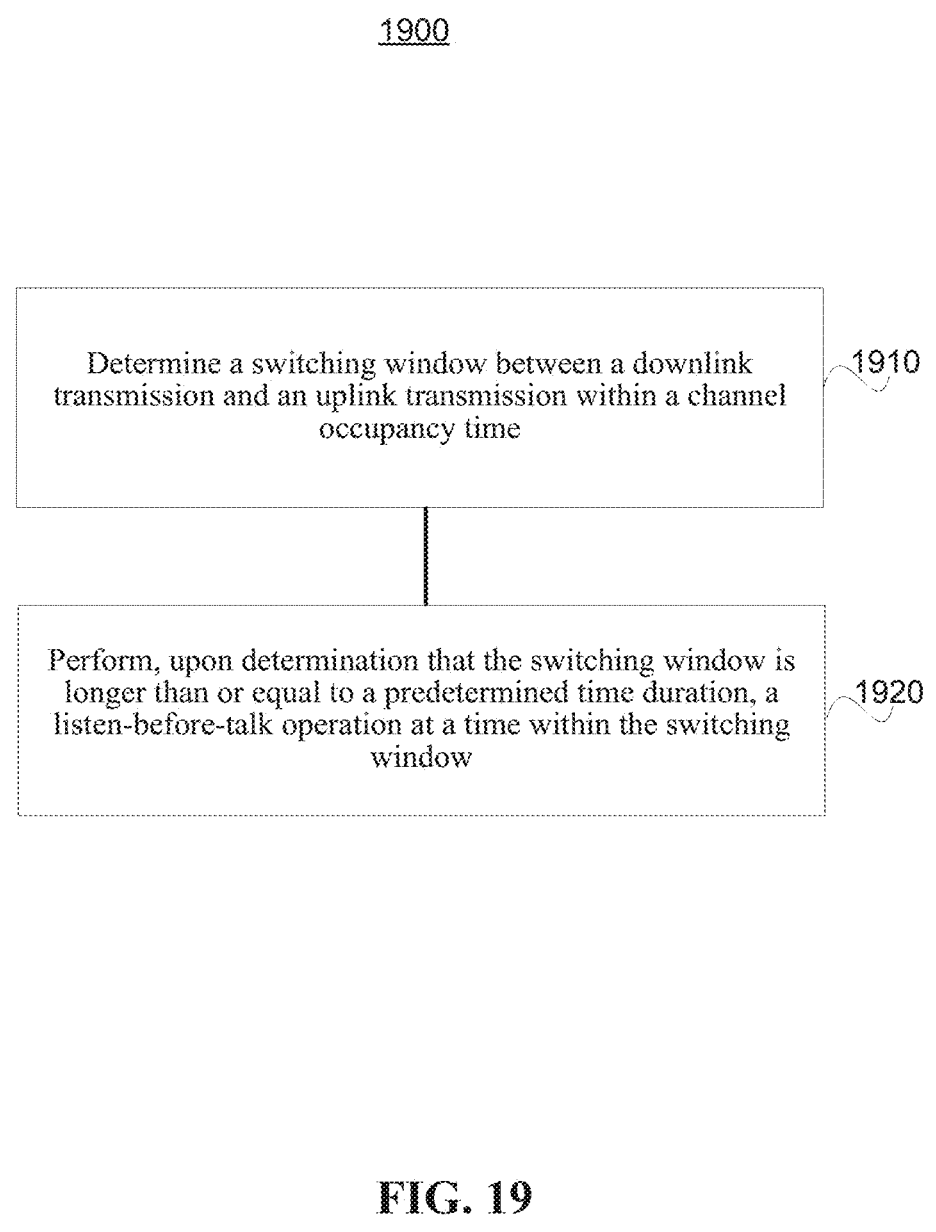

1900

Determine a switching window between a downlink transmission and an uplink transmission within a channel occupancy time          ~1910

Perform, upon determination that the switching window is longer than or equal to a predetermined time duration, a listen-before-talk operation at a time within the switching window          ~1920

Figure 20:
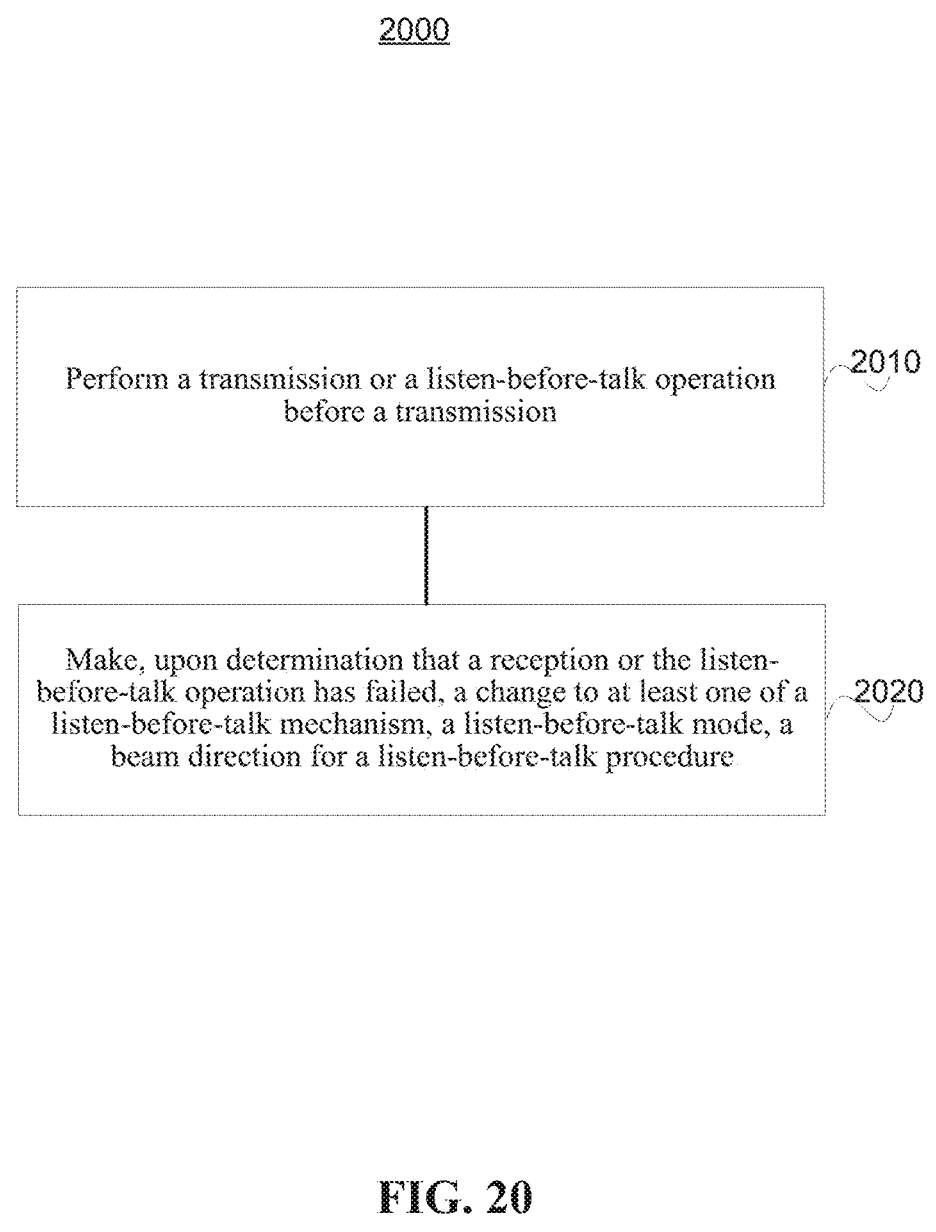

Perform a transmission or a listen-before-talk operation before a transmission ⟋2010

Make, upon determination that a reception or the listen-before-talk operation has failed, a change to at least one of a listen-before-talk mechanism, a listen-before-talk mode, a beam direction for a listen-before-talk procedure ⟋2020

CHANNEL ACCESS PROCEDURE

CROSS REFERENCE TO RELATED APPLICATIONS

This patent document is a continuation of and claims benefit of priority to International Patent Application No. PCT/CN2020/107954, filed on Aug. 7, 2020. The entire content of the before-mentioned patent application is incorporated by reference as part of the disclosure of this application.

TECHNICAL FIELD

This patent document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, methods, apparatus, and systems for channel access procedures that include a listen-before-talk (LBT) rule for preventing a mismatch between a sensing beam and a transmission beam. This patent document also describes a channel occupancy rule, a transmission rule and an LBT rule for multiple transmissions associated with different beam directions, and an LBT rule for channel occupancy time (COT) sharing upon transmission of directional beam.

In one aspect, a data communication method includes detecting an idle channel by performing, by a communication node, an energy detection operation based on at least one of a transmission beam or a reception beam, and transmitting, upon detection of the idle channel in at least one of the transmission beam or the reception beam, messages through the transmission beam corresponding to the idle channel.

In another aspect, a data communication method includes performing a listen-before-talk operation before a transmission in a plurality of beam directions and performing a transmission over each of the plurality of beam directions during a channel occupancy time.

In another aspect, a data communication method includes performing one or more transmissions through one or more transmission channels by occupying one or more beam directions.

In another aspect, a data communication method includes obtaining, the communication node, a listen-before-talk operation information, performing one or more listen-before-talk operations on the one or more beam directions, and performing the one or more transmissions based on a result of the one or more listen-before-talk operations on the one or more beam directions.

In another aspect, a data communication method includes determining a switching window between a downlink transmission and an uplink transmission within a channel occupancy time, and performing, upon determination that the switching window is longer than or equal to a predetermined time duration, a listen-before-talk operation at a time within the switching window.

In another aspect, a data communication method includes performing a transmission or a listen-before-talk operation before a transmission, and making, upon determination that a reception or the listen-before-talk operation has failed, a change to at least one of a listen-before-talk mechanism, a listen-before-talk mode, a beam direction for a listen-before-talk procedure.

BRIEF DESCRIPTION OF THE DRAWINGS

FIG. 15 shows an example of a data communication method based on some example embodiments of the disclosed technology.

FIG. 17 shows another example of a data communication method based on some example embodiments of the disclosed technology.

FIG. 19 shows another example of a data communication method based on some example embodiments of the disclosed technology.

FIG. 20 shows another example of a data communication method based on some example embodiments of the disclosed technology.

DETAILED DESCRIPTION

Figure 1:
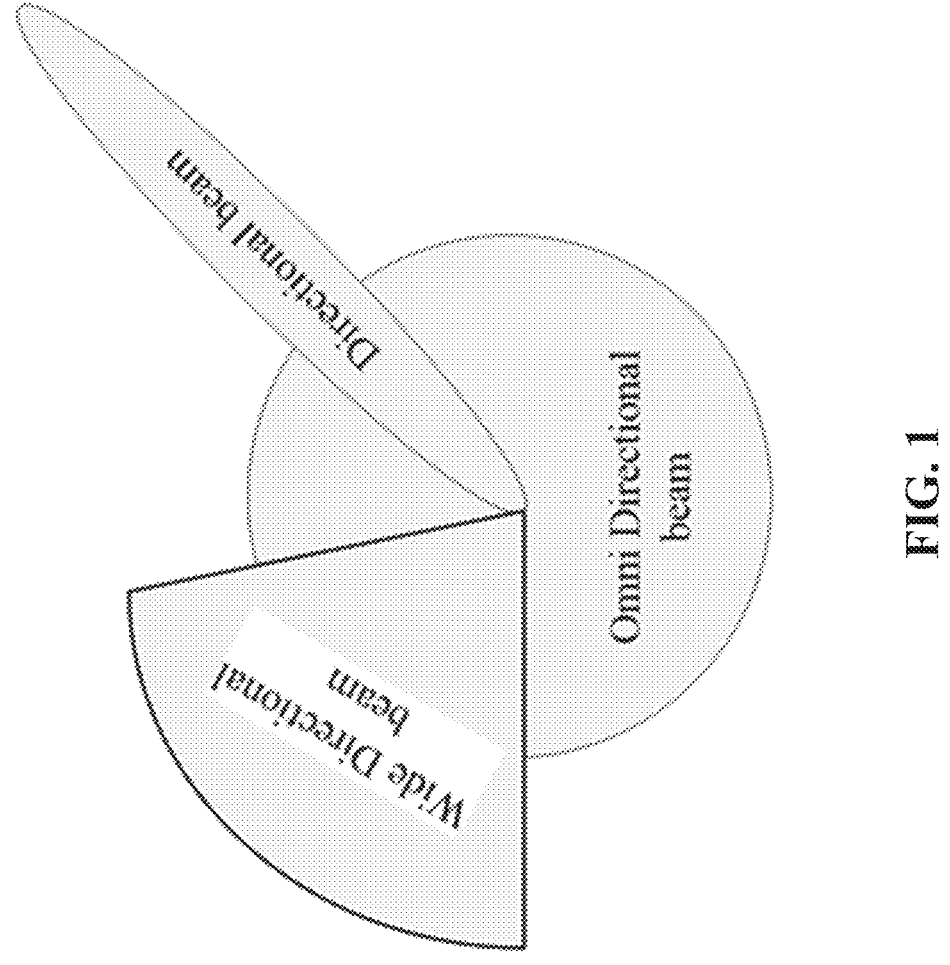
FIG. 1 shows different beam modes including directional beam mode, wide directional beam mode, and omni directional beam.

The disclosed technology can be used in some embodiments to detect a mismatch in the transmission beams and provide a listen-before-talk (LBT) rule design associated with such a mismatch detection. The disclosed technology can also be used in some embodiments to provide the channel occupancy rule, transmission rule and LBT rule for multiple transmissions associated with different beam directions. In some embodiments, the disclosed technology can be used to implement LBT rule for channel occupancy time (COT) sharing when a transmission is made with directional beams. The disclosed technology can also be used in some embodiments to handle LBT failures.

With the emergence of fifth-generation (5G) new radio (NR) networks will come an explosion of new user data applications that will be supported by the NR networks. With this rapid growth of user data, the demand for spectrum will increase dramatically. In order to alleviate the requirement of spectrum, equipment manufacturers and operators all over the world focus on the resource rich and free unlicensed spectrum, and carry out a series of related technology research and product development projects. Further, in RAN #86 Plenary meeting, a new SI (study item) was approved to study on supporting NR from 52.6 GHz to 71 GHz. In a transmission at a high frequency bandwidth, a fine beamforming using massive antenna elements is necessary to combat high propagation loss. If an omni-directional LBT is also used for the high frequency transmission, direction mismatching between LBT and transmission happens. This will often cause an exposed node problem and a hidden node problem. Thus, directional LBT will need to be introduced, but, if supported, a mismatch may occur between a sensing beam and a transmission beam. Therefore, the disclosed technology can be used in some embodiments to provide some rules to achieve a match between the sensing beam and the transmission beam.

Further, owing to the beamforming transmission modes, in order to transmit messages to the serving UEs in a certain range, a base station (e.g., gNB) needs to transmit different beams toward different directions, which can be within the same or different time units. Therefore, gNB only performs a directional LBT once at the beginning of multiple DL transmissions, and some beams within MCOT may experience an unoccupied channel and the other beams may encounter a channel with a higher interference from other coexisting nodes. Therefore, the disclosed technology can be used in some embodiments to provide new LBT rules and transmission rules for multiple transmissions. Besides, for COT sharing case, gNB and UE may both use a narrow beam for LBT and data transmissions and may have different beam widths and beam directions. For such feature, we will provide some rule on COT sharing.

In addition, if a communication node (e.g., base station or user equipment, UE) cannot access channel using a channel access procedure, then how to implement channel access before the next transmission opportunity will become an urgent problem. In this regard, the disclosed technology can be used in some embodiments to provide some feasible and effective solutions to solve or alleviate such a problem.

In the context of this patent document, the term "node" or "communication node" can be used to indicate a mobile device such as user equipment (UE) or a base station (BS) such as gNB.

In some implementations of this patent document, LBT mode includes at least one of the following: directional LBT, omni-directional LBT, wide beam-based LBT, multiple beam-based LBT. Here, LBT mode can also be at least one of omni-directional LBT, single beam directional LBT, multiple beam directional LBT, wide beam directional LBT.

In some implementations of this patent document, LBT type can be at least one of the following: No LBT, Cat2 LBT, Cat3 LBT, Cat4 LBT, multiple Cat2 LBT. In some implementations, Cat2 LBT can have different durations of time domain, e.g., duration can be one of 0.5 us, 1 us, 2 us, 3 us, 4 us, 5 us, 6 us, 7 us, 8 us, any combination of the mentioned values.

Embodiment 1

This embodiment provides a method to determine the range of energy detection of CCA (Clear Channel Assessment).

CCA energy detection can consider at least one of the following methods:

Alternative 1: CCA energy detection is based on the transmission beam(s).

Alternative 2: CCA energy detection is based on the received beam(s).

For Alternative 1 and Alternative 2, if one or more nodes detect channel(s) as idle in the transmission/reception beam(s) before transmitting a transmission, then the one or more nodes can transmit one or more transmissions in the transmission beam(s). Otherwise, if the one or more nodes detect channel(s) as busy in the transmission/reception beam(s), methods implemented based on the embodiment 9 discussed below can be used.

In addition, a different transmission/reception beam mode is related to a different CCA detection threshold, or a new CCA detection threshold can be introduced in addition to a normal CCA detection threshold as will be discussed in Embodiment 2 below.

Alternative 3: CCA energy detection is based on at least one of transmission beam and received beam. Besides, whether node(s) can transmit a transmission on the transmission beam may depend on some rules as will be discussed in Embodiment 3 below. The mode of CCA energy detection can be determined based on at least one of the following: RRC signaling, physical layer DCI signaling, pre-defined.

Embodiment 2

Based on Alternative 1, or, Alternative 2 of Embodiment 1, this embodiment can provide more detailed designs and descriptions.

Case 1: The different transmission/reception beam mode is related to different CCA detection threshold.

In some implementations, CCA detection threshold can be a function of beam angle and/or beam width.

FIG. 1 shows different beam modes including directional beam mode, wide directional beam mode, and omni directional beam.

In some implementations, the transmission/reception beam mode includes directional beam (or narrow directional beam), or wide directional beam, or omni-directional beam, as shown in FIG. 1. In one example, CCA detection threshold for directional beam, Thr_1, and wide directional beam, Thr_2, can be a function of beam angle and/or beam width.

For instance, directional beam corresponds to directional beam based CCA detection threshold, marked as Thr_1; wide directional beam corresponds to wide directional beam based CCA detection threshold, marked as Thr_2; omni-directional beam corresponds to omni-directional beam based CCA detection threshold, marked as Thr_3.

When the transmission/reception beam is in a directional beam mode, the node performs a channel access procedure based on a directional beam based CCA detection threshold (Thr_1) before transmitting a transmission on a transmission beam. If the detected energy within the transmission/reception beam is lower than or equal to the directional beam based CCA detection threshold (Thr_1), channel is determined as idle (i.e., available) and the node can transmit a transmission on a transmission beam. Otherwise, if the detected energy within the transmission/reception beam is larger than the directional beam based CCA detection threshold (Thr_1), the channel is determined as busy (i.e., unavailable) and the node cannot transmit a transmission on a transmission beam.

The same or similar manner is applicable to a wide directional beam mode or an omni-directional beam mode for the received beam.

Case 2: Introduce a new CCA detection threshold. This new threshold is defined for the case where there is a mismatch between the energy detection beam and the transmission beam.

No matter which receive beam mode is used, the node only determines whether the current channel is idle by this new CCA detection threshold. For example, if the detected energy within the receive beam is lower than or equal to the new CCA detection threshold (marked as Thr_4), channel is determined to be idle and the node can transmit a transmission on a transmission beam. Otherwise, if the detected energy within the receive beam is larger than the new CCA detection threshold (Thr_4), the channel is determined to be busy and the node cannot transmit a transmission on a transmission beam.

Case 3: A combination of normal CCA detection threshold and new introduced CCA detection threshold.

For example, if the detected energy within the receive beam is larger than a normal CCA detection threshold Thr_5, it does not directly determine whether the current channel corresponding to the transmission beam is unavailable but continues to assess whether the detected energy within the receive beam is lower than or equal to a new CCA detection threshold Thr_6. upon meeting this condition, the node can determine the channel as idle and can transmit a transmission on a transmission beam.

Embodiment 3

Based on Alternative 3 of Embodiment 1, this embodiment can be implemented to provide more detailed designs and descriptions.

The core idea of these schemes is to design some rules to determine whether the current channel on a transmission beam is available based on detection results on the transmission beam and the reception beam. That is to say, the node performs an energy detection on a transmission beam and a reception beam before transmitting a transmission on a transmission beam. Specific rules on CCA success determination or determining a channel of a transmission beam as idle can be considered as will be discussed below:

Method 1: Only set one CCA detection threshold, as shown in rows 1-4 of Table 1 below. The core idea is that as long as the detected energy in at least one of transmission beam and the reception beam is lower than or equal to a CCA detection threshold, marked as Thr_7, then the channel on the transmission beam is determined to be idle or available and the node can transmit a transmission on a transmission beam. Otherwise, if the detected energy in both the transmission beam and the reception beam is larger than the CCA detection threshold, the current channel on the transmission beam is determined to be unavailable.

For example, rules 1-8 can be applied as will be discussed below.

Rule 1: when the node performs a channel access operation on a transmission beam and a reception beam, if the detected energy on the transmission beam is lower than or equal to the CCA detection threshold, labeled as Thr_7, and the detected energy on the reception beam is lower than or equal to the CCA detection threshold, labeled as Thr_7, the channel on the transmission beam can be used or seen as idle (available).

Rule 2: when the node performs a channel access operation on a transmission beam and a reception beam, if the detected energy on the transmission beam is lower than or equal to the CCA detection threshold, labeled as Thr_7, but the detected energy on the reception beam is larger than the CCA detection threshold, labeled as Thr_7, then the channel on the transmission beam can be identified as idle (available).

Figure 2:
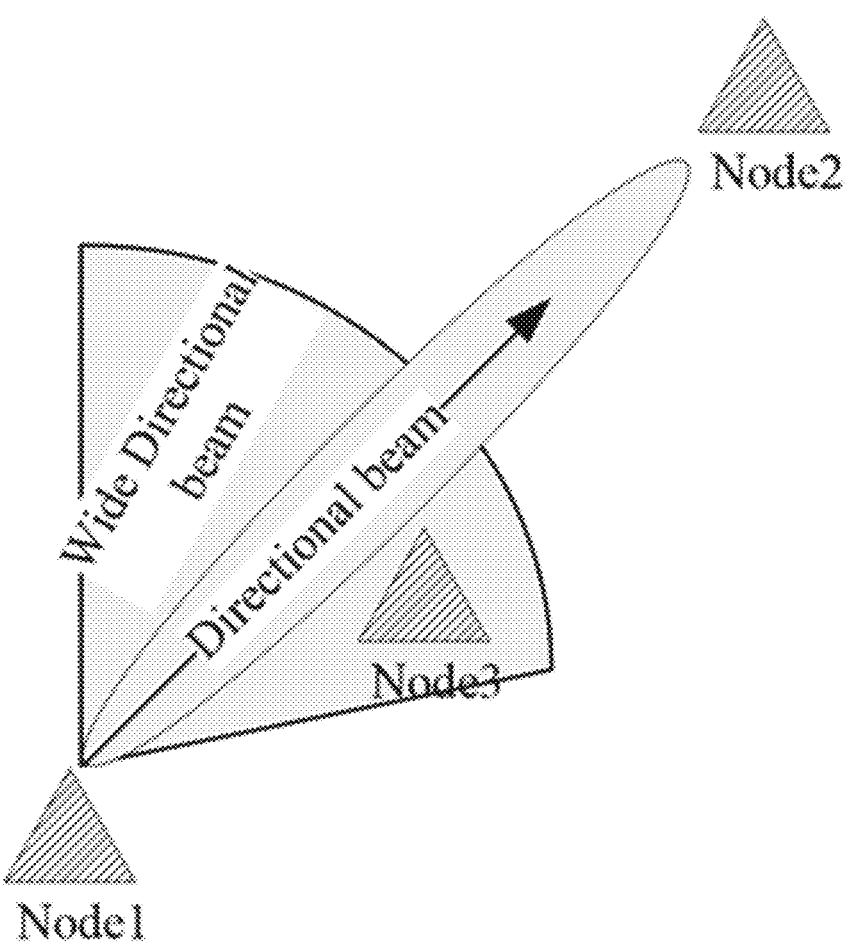
FIG. 2 shows a node issue in the cases of the detected energy on the transmission beam<=Thr_7 and the detected energy on the reception beam>Thr_7.

In some situations, this method may cause an exposed node issue as shown in FIG. 2, and thus the CCA assessment is based on the detected energy in the transmission beam. Further, it is necessary to introduce the CCA detection in the transmission beam and the reception beam methods to reduce the impact of the exposed node issue.

FIG. 2 shows a node issue in the cases of the detected energy on the transmission beam<=Thr_7 and the detected energy on the reception beam>Thr_7.

Rule 3: when the node performs a channel access operation on the transmission beam and the reception beam, if the detected energy on the transmission beam is larger than the CCA detection threshold, labeled as Thr_7, but the detected energy on the reception beam is lower than or equal to the CCA detection threshold, labeled as Thr_7, then the channel on the transmission beam can be identified as idle (available).

Figure 3:
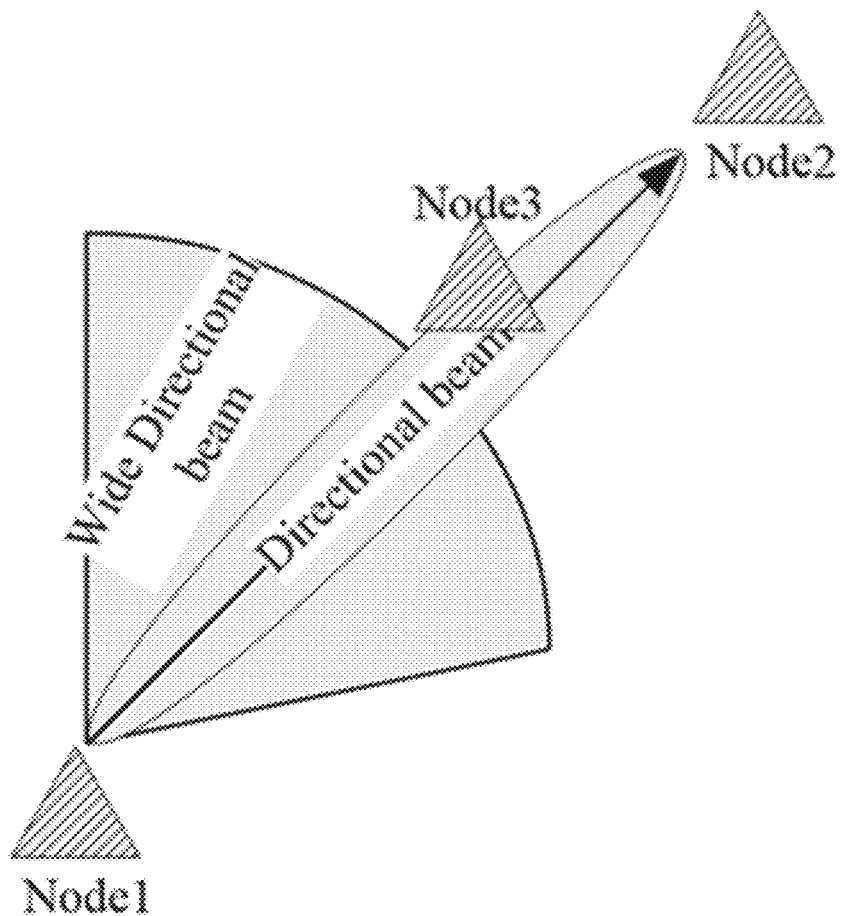
FIG. 3 shows a node issue in the cases of the detected energy on the transmission beam>Thr_7 and the detected energy on the reception beam<=Thr_7.

For this case, FIG. 3 shows that it may cause a hidden node issue when the availability of the channel on the transmission beam is evaluated only by the energy detected in the reception beam because an interference may exist in an area that is within the transmission beam and outside the reception beam. In order to alleviate this issue, we can consider setting double CCA detection thresholds or the reception node assistance manner.

FIG. 3 shows a node issue in the cases of the detected energy on the transmission beam>Thr_7 and the detected energy on the reception beam<=Thr_7.

Rule 4: when the node performs a channel access operation on the transmission beam and the reception beam, if the detected energy on the transmission beam is larger than the CCA detection threshold, labeled as Thr_7, and the detected energy on the reception beam is larger than the CCA detection threshold, labeled as Thr_7, then the channel on the transmission beam can be identified as busy (unavailable). In some implementations, for this case, double CCA detection thresholds can be considered/used.

Method 2: Set double CCA detection thresholds as shown in rows 5-8 of Table 1 below.

Rule 5: when the node performs a channel access operation on the transmission beam and the reception beam, if the detected energy on the transmission beam is lower than or equal to the CCA detection threshold, labeled as Thr_7, and the detected energy on the reception beam is larger than the CCA detection threshold, labeled as Thr_7. Further, if the difference in the energy detected in the transmission beam and the reception beam is lower than or equal to an additional CCA detection threshold, labeled as Thr_8, then the channel on the transmission beam can be identified as idle (available).

Rule 6: when the node performs a channel access operation on the transmission beam and the reception beam, if the detected energy on the transmission beam is lower than or equal to the CCA detection threshold, labeled as Thr_7, and the detected energy on the reception beam is larger than the CCA detection threshold, labeled as Thr_7. Further, if the difference in the energy detected in the transmission beam and the reception beam is larger than additional CCA detection threshold, labeled as Thr_8, then the channel on the transmission beam can be identified as busy (unavailable).

Rule 7: when the node performs a channel access operation on the transmission beam and the reception beam, if the detected energy on the transmission beam is larger than the CCA detection threshold, labeled as Thr_7, and the detected energy on the reception beam is lower than or equal to the CCA detection threshold, labeled as Thr_7. Further, if the difference in the energy detected in the transmission beam and the reception beam is lower than or equal to an additional CCA detection threshold, labeled as Thr_8, then the channel on the transmission beam can be identified as idle (available).

Rule 8: when the node performs a channel access operation on the transmission beam and the reception beam, if the detected energy on the transmission beam is larger than the CCA detection threshold, labeled as Thr_7, and the detected energy on the reception beam is lower than or equal to the CCA detection threshold, labeled as Thr_7. Further, if the difference in the energy detected in the transmission beam and the reception beam is larger than an additional CCA detection threshold, labeled as Thr_8, then the channel on the transmission beam can be identified as busy (unavailable).

The above additional CCA detection threshold can also be defined as a new threshold relative to the CCA detection threshold Thr_7. That is to say, if at least one of the energy detected in the transmission beam and the energy detected in the reception beam is lower than or equal to a new detection threshold (Thr_8), then the channel on the transmission beam can be identified as idle (available), as shown in rows 9-14 of Table 1.

TABLE 1

| | | | | | |
|---|---|---|---|---|---|
| | | | rules on CCA detection | | |
| Rules | Detected energy on the transmission beam (marked as A) | Detected energy on the reception beam (marked as B) | The difference in the detected energy between transmission beam and the reception beam | New CCA detection threshold | CCA result |
| 1 | <=Thr _7 | <=Thr _7 | / | / | idle |
| 2 | <=Thr _7 | >Thr _7 | / | / | idle |
| 3 | >Thr _7 | <=Thr _7 | / | / | idle |
| 4 | >Thr _7 | >Thr _7 | / | / | busy |
| 5 | <=Thr _7 | >Thr _7 | <=Thr_8 | / | idle |
| 6 | <=Thr _7 | >Thr _7 | >Thr_8 | / | busy |
| 7 | >Thr _7 | <=Thr _7 | <=Thr_8 | / | idle |
| 8 | >Thr_7 | <=Thr -7 | >Thr_8 | / | busy |
| 9 | <=Thr _7 | >Thr _7 | / | B <= Thr_8 | idle |
| 10 | <=Thr _7 | >Thr _7 | / | B > Thr_8 | Identified as exposed node, but seen as channel to be idle |
| 11 | >Thr _7 | <=Thr _7 | / | A <= Thr_8 | Identified as hidden node, but think current interference within allowance range, so seen as channel to be idle. |
| 12 | >Thr _7 | <=Thr _7 | / | A > Thr_8 | Identified as hidden node, but think current interference beyond allowance range, so seen as channel to be busy |
| 13 | >Thr _7 | >Thr _7 | / | A <= Thr_8 Includes B<=, or >=Thr_8 | think current interference within allowance range, so seen as channel to be idle. |

TABLE 1-continued

| | | | | rules on CCA detection | |
| --- | --- | --- | --- | --- | --- |
| Rules | Detected energy on the transmission beam (marked as A) | Detected energy on the reception beam (marked as B) | The difference in the detected energy between transmission beam and the reception beam | New CCA detection threshold | CCA result |
| 14 | >Thr _7 | >Thr _7 | / | A, B > Thr_8 | think current interference beyond allowance range, so seen as channel to be busy |

Assumed that:

Thr_7 is a common CCA detection threshold for transmission beam or receive beam. Thr_8 is an additional CCA detection threshold that is used to assess the difference in the energy detection between transmission beam and the reception beam;

Embodiment 4

For the case of a directional LBT configuration, if the node performs a successful LBT, then a channel occupancy time can be initiated in the corresponding beam direction. For a beam switching case, the issues can include whether the node also needs to maintain an occupancy time in the switched beam direction, what type of LBT mechanism should be used for switched beam direction, whether the channel occupancy(s) corresponding to each beam direction should have the common channel occupancy time or respectively channel occupancy time, and how long the channel occupancy time for each beam direction is.

In order to resolve the above mentioned issues, this embodiment provides the following resolutions.

For a different beam direction case, the channel occupancy time can be maintained by at least one of the following:

Alternative 1: Common channel occupancy time.

To be specific, all/each beam direction(s) and/or all/each frequency carrier(s)/subband(s)/RB set(s)/Bandwidth part (BWP) can share a common channel occupancy time. The common channel occupancy time is related to the first successful LBT operation or determined based on the largest/smallest of channel occupancy time or random selection for all carrier(s)/subband(s)/RB set(s)/Bandwidth part (BWP). Here, LBT can be "back-off" LBT mechanism or "without back-off" LBT mechanism, e.g., Cat4 LBT, enhanced Cat4 LBT, one or multiple Cat2 LBT, No LBT. If the LBT is configured, then there is a need to define the relationship between the LBT and the channel occupancy time. Wherein, LBT operation includes at least one of directional listen-before-talk (LBT), omni directional LBT, wide directional beam LBT, multiple directional LBT, no LBT, Cat 4 LBT, enhanced Cat4 LBT, Cat2 LBT, or multiple Cat 2 LBT, beam direction for LBT, beam width for LBT, beam pattern/index for LBT.

Figure 4:
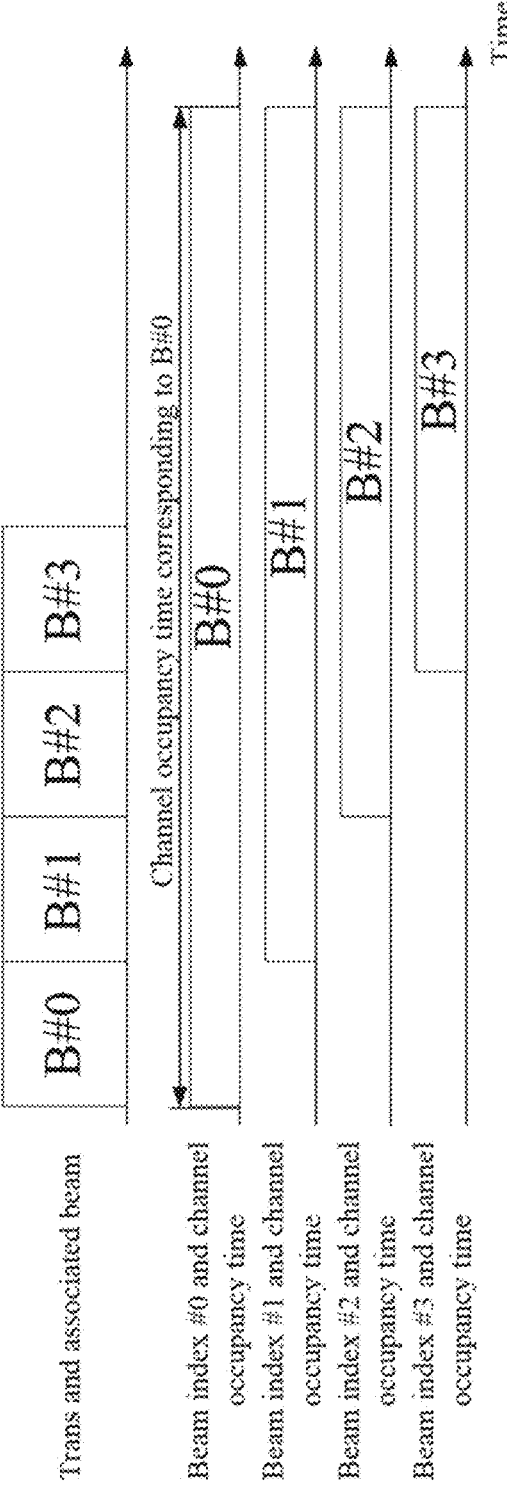
FIG. 4 shows a common channel occupancy time shared by all beam directions.

FIG. 4 shows a common channel occupancy time shared by all beam directions.

Take single frequency carrier(s)/subband(s)/RB set(s)/Bandwidth part (BWP) as example, for a switching beam, the channel occupancy time associated with the switching beam is the remaining channel occupancy time corresponding to the beam of an initiated common channel occupancy. As shown in FIG. 4, a common channel occupancy time are shared by all beam directions. Optionally, in this method, for the first beam, Cat4 LBT or enhanced Cat4 LBT or one or multiple Cat2 LBT or No LBT can be applied. For the subsequent beam, in some implementations, one or multiple Cat2 LBT or No LBT can be applied. In some implementations, if the LBT (e.g., Cat2 LBT such as single Cat2 LBT or multiple Cat2 LBT, or No LBT) is configured, then there is a need to define the relationship of LBT and channel occupancy time.

Figure 5:
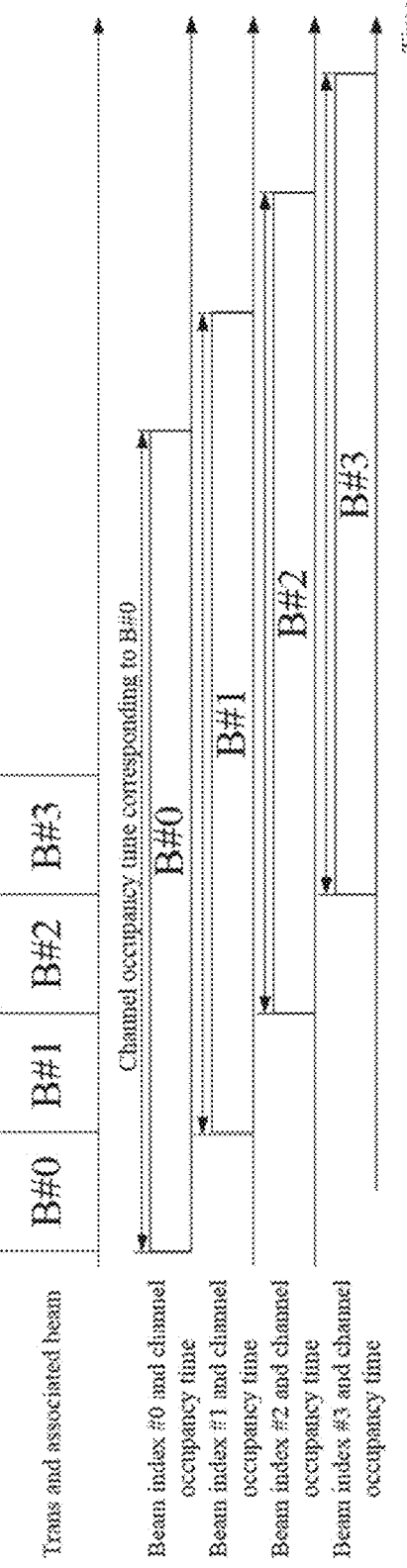
FIG. 5 shows a channel occupancy time maintained independently for each beam direction.

FIG. 5 shows a channel occupancy time maintained independently for each beam direction.

Alternative 2: Channel occupancy time is maintained independently for each beam direction, as shown in FIG. 5.

In this method, the channel occupancy time is related to the LBT operation. Wherein, LBT operation includes at least one of directional listen-before-talk (LBT), omni directional LBT, wide directional beam LBT, multiple directional LBT, no LBT, Cat 4 LBT, enhanced Cat4 LBT, Cat2 LBT, or multiple Cat 2 LBT, beam direction for LBT, beam width for LBT, beam pattern/index for LBT. Optionally, in this method, for the first beam, Cat4 LBT or enhanced Cat4 LBT or one or multiple Cat2 LBT or No LBT can be applied. For the subsequent beam, in some implementations, one or multiple Cat2 LBT or No LBT can be applied. In some implementations, if the LBT (e.g., Cat2 LBT such as single Cat2 LBT or multiple Cat2 LBT, or No LBT) is configured, then there is a need to define the relationship of LBT and channel occupancy time.

In some implementations, a different LBT mechanism can correspond to a different channel occupancy time.

Figure 6:
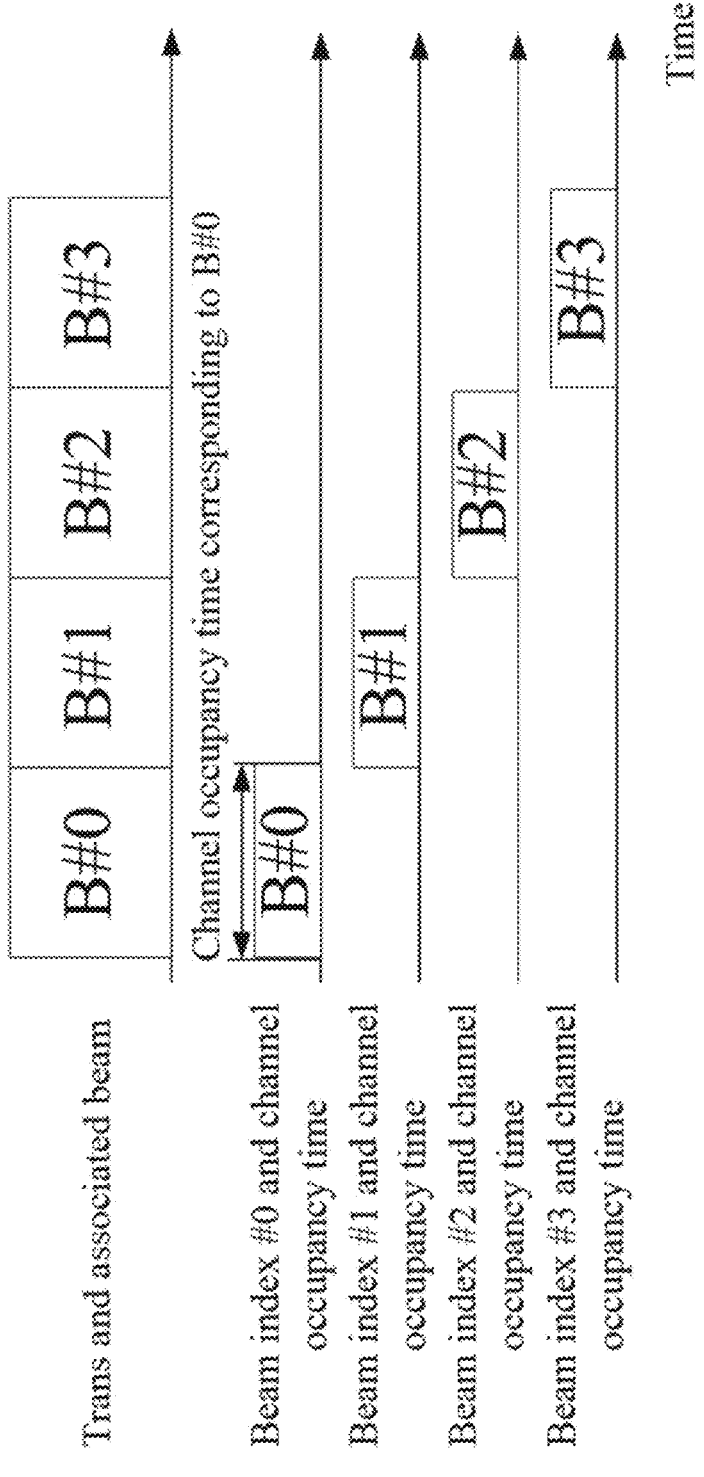
FIG. 6 shows that a channel occupancy time is maintained independently for each beam direction and each channel occupancy time is related to the transmission time corresponding to the beam direction.

FIG. 6 shows that a channel occupancy time is maintained independently for each beam direction and each channel occupancy time is related to the transmission time corresponding to the beam direction.

Alternative 3: Channel occupancy time is maintained independently for each beam direction and each channel occupancy time is related to the transmission time corresponding to the beam direction, as shown in FIG. 6.

For example, the node transmits a transmission using beam #0 in the resource #0, then channel occupancy time corresponding to beam #0 is a time duration corresponding to resource #0.

For the first beam, Cat4 LBT or enhanced Cat4 LBT or one or multiple Cat2 LBT or No LBT can be applied. For the subsequent beam, in some implementations, one or multiple Cat2 LBT or No LBT can be applied. In some implementations, if the LBT (e.g., Cat2 LBT such as single Cat2 LBT or multiple Cat2 LBT, or No LBT) is configured, then there is a need to define the relationship between the LBT and the channel occupancy time.

As another example, 3 beam indices are used for DL transmissions respectively and each beam direction can occupy a time domain occasion, as shown in Table 2.

TABLE 2

Relationship among beam index and channel occupancy time length associated with a beam and time resource index

| index | Time resource index | Beam information/ index | Channel occupancy time {beam index, channel occupancy time) |
|---|---|---|---|
| 1 | 1 | 1 | {{1, 1},{2, 2},{3, 3}} |
| 2 | 2 | 2 | {{1, 0},{2, 1},{3, 2}} |
| 3 | 3 | 3 | {{1, 0},{2, 0},{3, 1}} |

Figure 7:
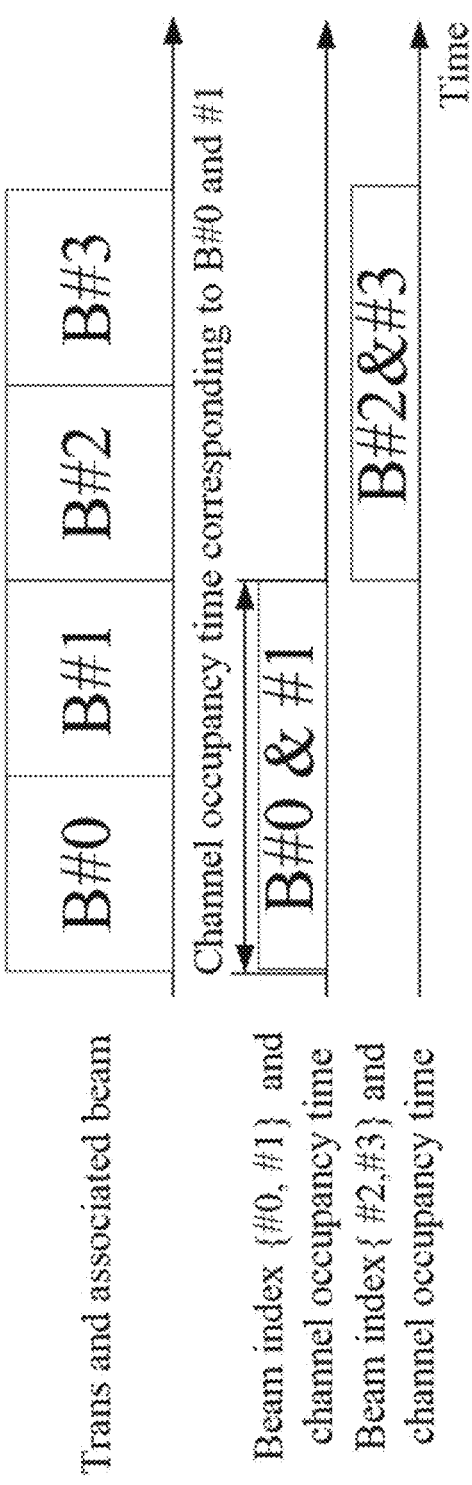
FIG. 7 shows a channel occupancy time maintained independently for some beam directions.

FIG. 7 shows a channel occupancy time maintained independently for some beam directions.

> Alternative 4: Channel occupancy time is maintained independently for some beam directions and each channel occupancy time is related to the transmission time corresponding to some beam directions, as shown in FIG. 7. In some implementations, the channel occupancy time can be configured by a pre-defined manner or the relationship between the LBT mechanism and the occupancy time.

For this method, it will be helpful to reduce the overhead of performing LBT. Further, there are benefits for supporting spatial reuse.

For the first group beam, Cat4 LBT or enhanced Cat4 LBT or one or multiple Cat2 LBTs or No LBT can be applied. For the subsequent beam, in some implementations, one or multiple Cat2 LBTs or No LBT can be applied. In some implementations, if the LBT (e.g., Cat2 LBT such as single Cat2 LBT or multiple Cat2 LBT, or No LBT) is configured, then there is a need to define the relationship between the LBT and the channel occupancy time. Optionally, single or multiple beam LBT mode also can be considered.

The above mentioned method can be applied for one or multiple frequency carrier(s)/subband (s)/RB set(s)/Bandwidth part (BWP) case.

Embodiment 5

The disclosed technology can be used in some embodiments to keep the right of channel within a channel occupancy time.

In the case where different beam directions are used for transmission, the node can transmit a transmission by at least one of the following:

> Alternative 1: once the node starts transmitting a transmission with one or more beam direction, then this beam direction(s) will keep carrying the transmission until a link direction switching occurs, or the one or more transmissions are completed.

Figure 8:
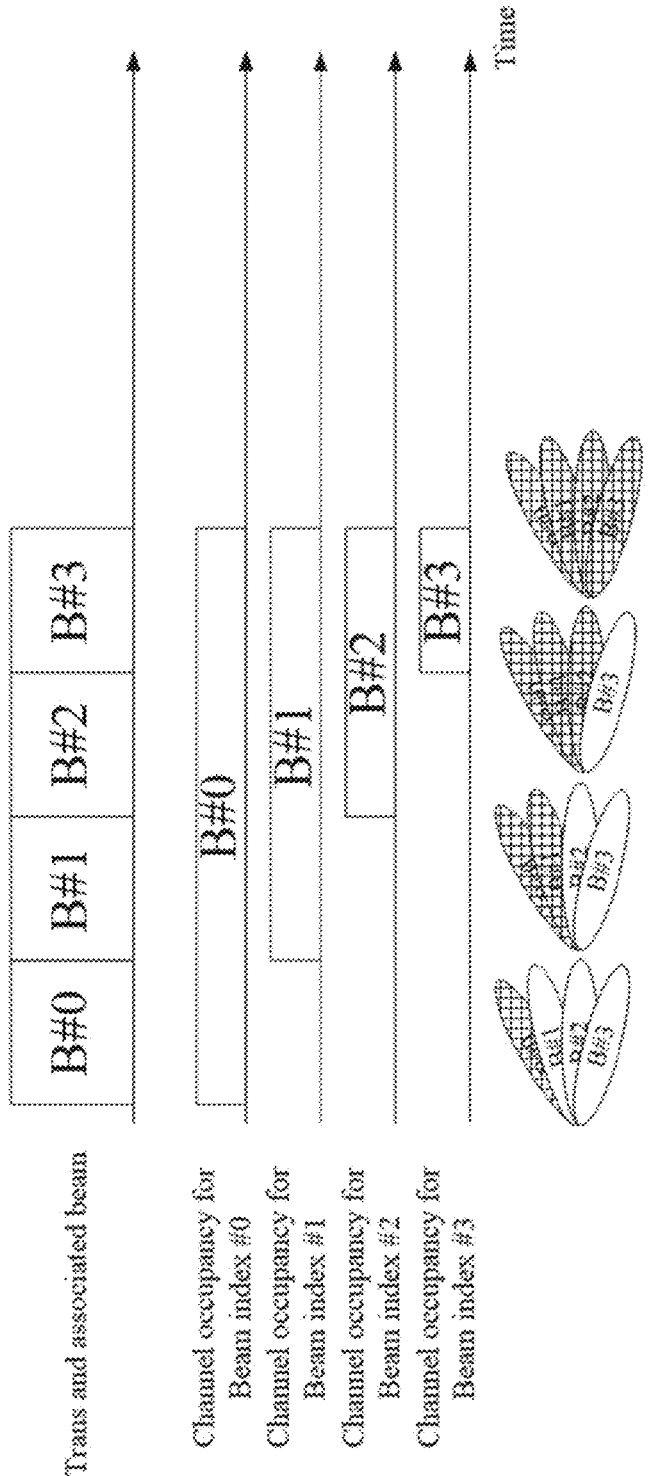
FIG. 8 shows that the transmission with beam directions keeps occupying the channel corresponding to the beam directions until a link direction switching for each beam direction occurs.

FIG. 8 shows that the transmission with beam directions keeps occupying the channel corresponding to the beam directions until a link direction switching for each beam direction occurs.

As shown in FIG. 8, the base station (BS) is taken as an example to illustrate a method of Alternative 1, and it is assumed that BS transmits B #0, B #1, B #2 and B #3 in the first, second, third and fourth transmission occasion, respectively.

In the first transmission occasion, BS only transmits a transmission in B #0 to ensure the channel not to be occupied in B #0 direction, then in the second transmission occasion, BS transmits a transmission in B #0 and B #1 simultaneously. Similarly, in order to avoid the channel corresponding to B #0 and B #1 not to be occupied, in the third transmission occasion, BS can transmit a transmission in B #0, B #1 and B #3, simultaneously. The same method also can be applied in the subsequent transmission occasion.

Optionally, according to the reception of DL transmission, UE can obtain the best reception beam direction for reception DL.

In terms of the channel occupancy, this method can also be based on the omni-directional LBT.

Optionally, Cat4 LBT or enhanced Cat4 LBT or one or multiple Cat2 LBT or No LBT can be applied. Single beam LBT or multiple beam LBT can be applied.

Optionally, the node only needs to introduce an additional LBT before a certain beam index, e.g., in the second resource occasion, the node may perform an additional LBT in the beam index #1.

> Alternative 2: The node transmits a transmission with multiple beam directions and the beam directions for the transmission contain all beam directions corresponding to the current transmission and the subsequent transmission.

Figure 9:
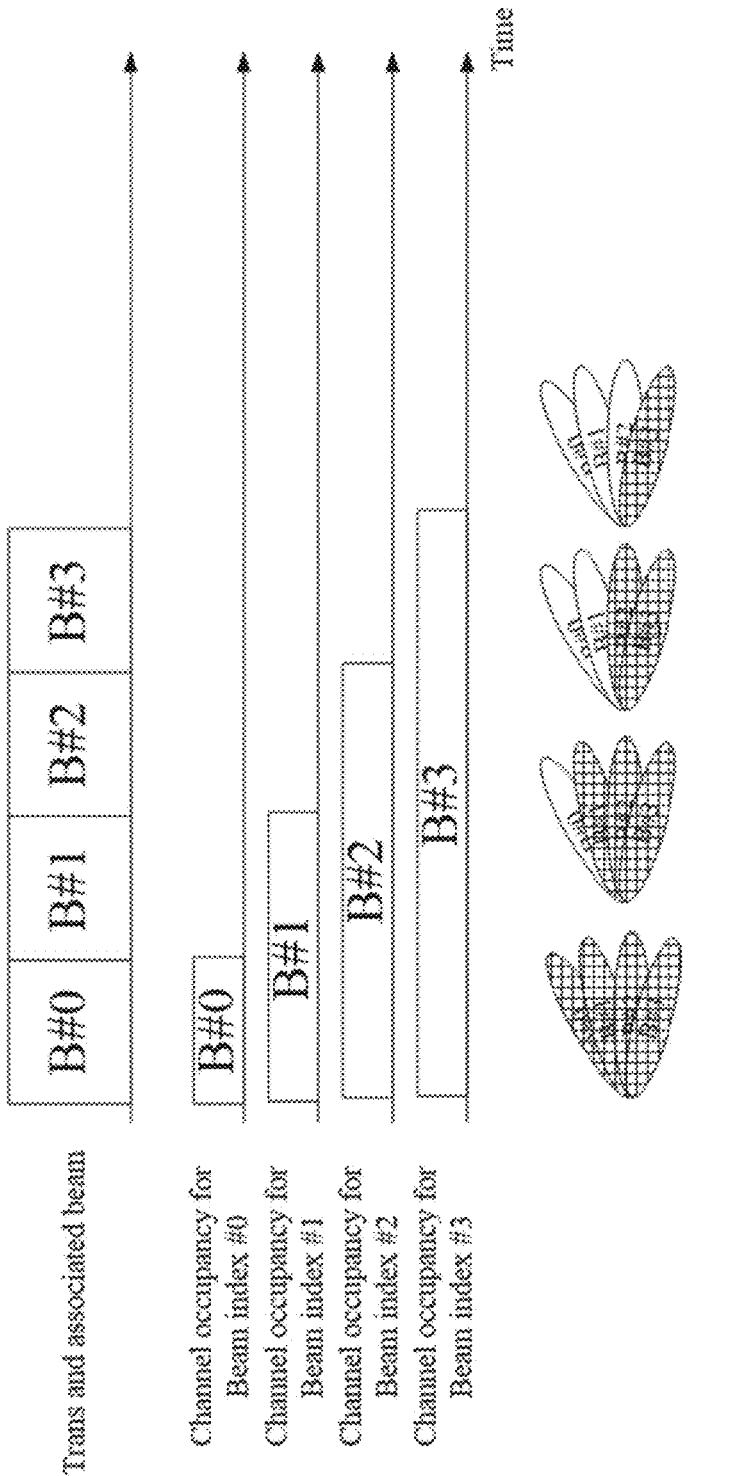
FIG. 9 shows that the transmission is performed in multiple beam directions such that the beam directions for the previous transmission include all beam directions for the subsequent transmission.

FIG. 9 shows that the transmission is performed in multiple beam directions such that the beam directions for the previous transmission include all beam directions for the subsequent transmission.

As shown in FIG. 9, the base station (BS) is taken as an example to illustrate a method of Alt-2, and it is assumed that BS transmits B #0, B #1, B #2 and B #3 in the first, second, third and fourth resource, respectively.

In order to reduce the overhead of performing LBT, some transmission rules can be considered.

In the first transmission occasion, BS can transmit a transmission in B #0, B #1, B #2 and B #3. In the second transmission occasion, BS only needs to transmit a transmission in B #1, B #2 and B #3 simultaneously. Similarly, in the third transmission occasion, BS can transmit a transmission in B #2 and B #3, simultaneously. The same method also can be applied in the subsequent transmission occasion.

In some implementations, Cat4 LBT or enhanced Cat4 LBT or one or multiple Cat2 LBT or No LBT, and/or, single beam LBT or multiple beam LBT can be applied for the starting point of transmission. If LBT is performed successfully, then the following transmission will can perform no LBT operation.

> Alternative 3: for the first M beam directions, for the remaining N-M beam directions, Alt-2 method can be applied.

Figure 10:
FIG. 10 shows a method for transmitting B #0, B #1, B #2 and B #3 in the first, second, third and fourth resources, respectively.

FIG. 10 shows a method for transmitting B #0, B #1, B #2 and B #3 in the first, second, third and fourth resources, respectively.

As shown in FIG. 10, the base station (BS) is taken as an example to illustrate a method of Alternative 3, and it is assumed that BS transmits B #0, B #1, B #2 and B #3 in the first, second, third and fourth resource, respectively.

In order to reduce the overhead of performing LBT, some transmission rules can be considered.

For the first two transmission occasions, BS can transmit a transmission with B #0, B #1 in first transmission occasion while transmitting a transmission with B #1 in the second transmission occasion. For the remaining two transmission occasions, BS can transmit a transmission with B #2, B #3 in third transmission occasion while transmitting a transmission with B #3 in the fourth transmission occasion.

In some implementations, Cat4 LBT or enhanced Cat4 LBT or one or multiple Cat2 LBT or No LBT, and/or, single beam LBT or multiple beam LBT can be applied for the starting point of the first M transmission, for the starting point of the remaining of N-M transmission. If LBT success, then the remaining transmission can perform no LBT operation within the first M transmission, the remaining of N-M transmission.

Figure 11:
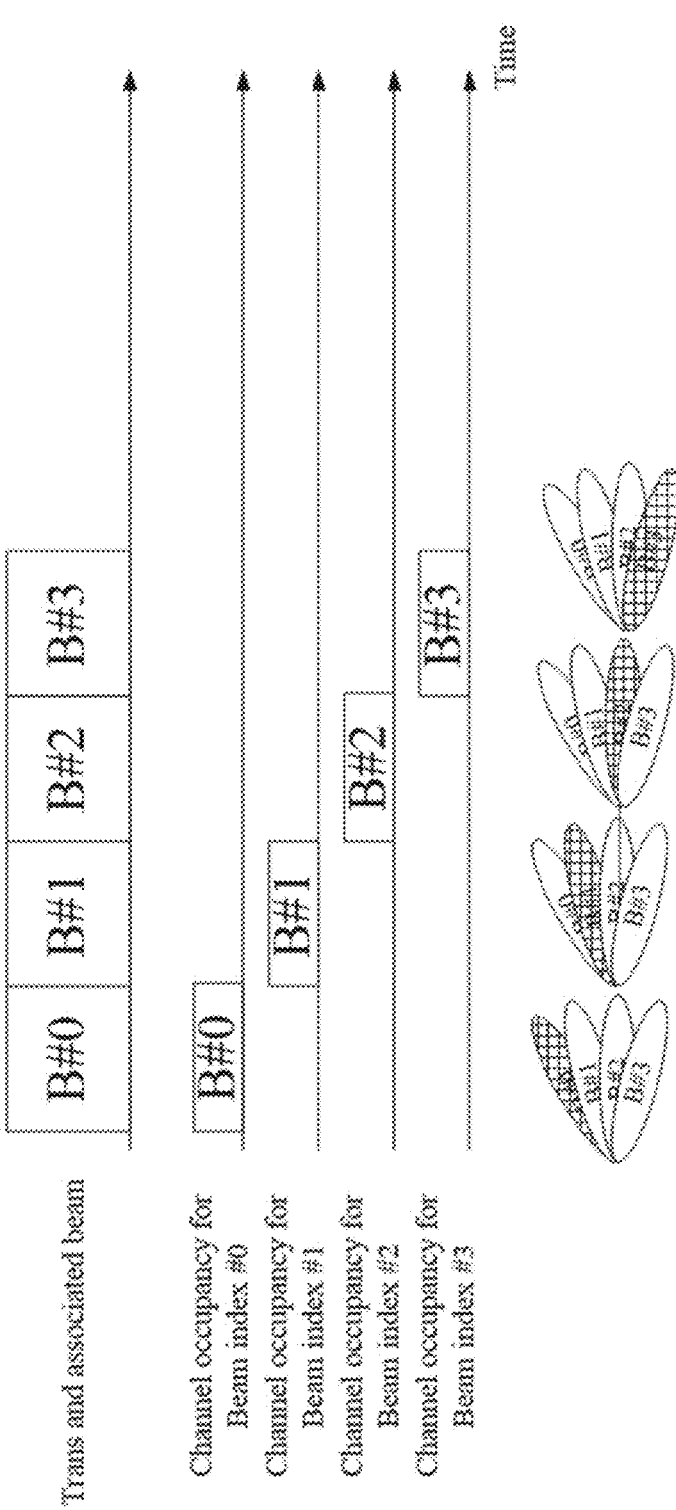
FIG. 11 shows a method for transmitting a single beam for each resource occasion.

FIG. 11 shows a method for transmitting a single beam for each resource occasion.

Alternative 4: single beam is transmitted for each resource occasion as shown in FIG. 11. The disclosed technology can be implemented in some embodiments as discussed below.

Embodiment 6

This embodiment will provide an LBT rule for multiple DL/UL transmission(s) with one or multiple beam directions.

For multiple DL transmissions case, considering the number of DL transmission with different beam directions, if LBT is applied before each DL transmission, then the overhead of performing LBT operation will be considerably large. Based on this, one of the following method can be considered:

Normal Method: before switching the beam, a directional LBT is performed if configured. This method may cause an extreme overhead of LBT and increase the probability of losing the channels.

Method 1: before the first transmission, one or multiple beam based LBT can be applied if configured. Optionally, If LBT is performed successfully in one or more beam directions, then the node transmits a transmission in the one or more of LBT successful beam direction(s). If the LBT successful beam direction(s) does not totally cover the beam direction(s) of the intended transmission, then an additional LBT can be introduced. An additional LBT can be single directional LBT, or multiple beam based LBT, or wider beam based LBT. In some implementations, the number of performing LBT is related to the number of transmission beams, and/or, the LBT result may correspond to LBT mode, and/or, LBT mode.

Optionally, the node can send indication information, e.g., available/unavailable beam indication, channel occupancy time for beam direction, beam switching information, the combination of the above. This method is equivalent to a pre-protection mechanism to inform surrounding nodes which beam directions are occupied in a certain period of time, which is helpful to achieve spatial reuse.

Method 2: before the first transmission, wider beam based LBT can be applied if configured. Optionally, If the wider beam range corresponding to the LBT successful does not totally cover all transmission direction, then an additional LBT can be introduced. An additional LBT can be single directional LBT, or multiple beam based LBT, or wider beam based LBT. In some implementations, the number of performing LBT is related to the number of transmission beam, and/or, the LBT result corresponding to LBT mode, and/or, LBT mode.

In some implementations, the node can inform this wider beam information to a neighboring node. In the case where another system coexists, the node can reserve or transmission information in the current unused/used beam directions. The benefit to do this is to reduce the overhead of performing LBT. Further, the node also can inform available/unavailable beam information in the time occasion.

Figure 12:
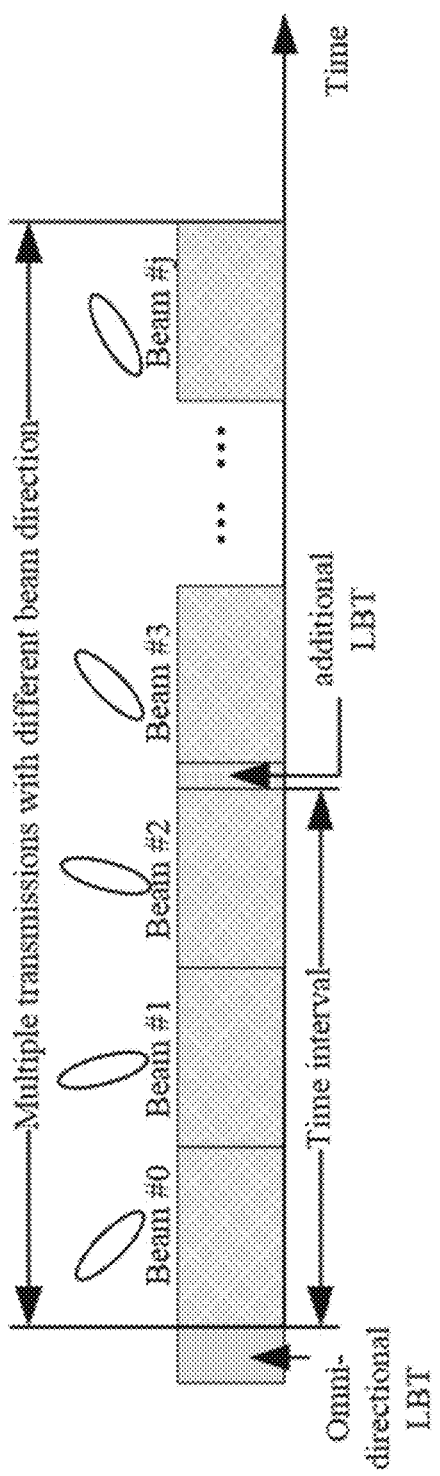
FIG. 12 shows an additional LBT applied for the ending point of the time interval.

FIG. 12 shows an additional LBT applied for the ending point of the time interval.

Method 3: define time interval or timer, as shown in FIG. 12. Optionally, it is related to LBT mode, and/or LBT mechanism and/or RRC signaling and/or DCI signaling and/or Pre-defined, or, the length of time interval can be related to statistics of interference state information.

Within the time interval or timer, the node does not need to perform LBT operation. Outside/at beginning of the time interval or timer, an (additional) LBT operation is introduced. Wherein, LBT operation includes at least one of directional listen-before-talk (LBT), omni directional LBT, wide directional beam LBT, multiple directional LBT, no LBT, Cat 4 LBT, enhanced Cat4 LBT, Cat2 LBT, or multiple Cat 2 LBT, beam direction for LBT, beam width for LBT, beam pattern/index for LBT.

In some implementations, the time interval can be configured and/or enabled by at least one of the following: RRC signaling, DCI signaling, pre-defined. E.g., the time interval is provided by RRC signaling, but enabled by DCI signaling; or the time interval is provided and enabled by RRC signaling; the time interval is provided by RRC signaling, whether the time interval is enabled is depend on LBT mode and/or LBT mechanism.

The granularity of time interval can be symbol-level, or, slot-level, or subframe-level, or mini slot-level.

Method 4: once LBT is performed successfully, the node does not need to perform LBT operation during the transmission unless it receives signaling/event trigger. E.g., DCI signaling, or timer expire, reach to a threshold. Optionally, threshold can be the number of beam switching. Or unless the node received a signaling/event trigger to perform a LBT operation, No LBT is applied before transmission.

That is to say, once the node receives signaling/event trigger, then it needs to perform an additional LBT before transmission. In some implementations, additional LBT can one or K Cat2 LBT, and/or directional LBT or multiple beam based LBT. In some implementations, each of K Cat2 LBT to be performed can use the same direction beam or different beam directions.

For the above method, if the additional LBT is single beam LBT, then its beam direction is determined based on the beam direction corresponding to the next transmission, or one of the beam corresponding to the subsequent transmission. if additional LBT is multiple beam-based LBT, its beam direction is determined based on the beams corresponding to the subsequent transmission. If additional LBT is wide beam-based LBT, its beam direction at least contains the direction of the subsequent transmission.

In some implementations, which type of LBT mode and/or beam direction is used depends on DCI signaling, and/or, default method, and/or, the remaining channel or beam information.

Figure 13:
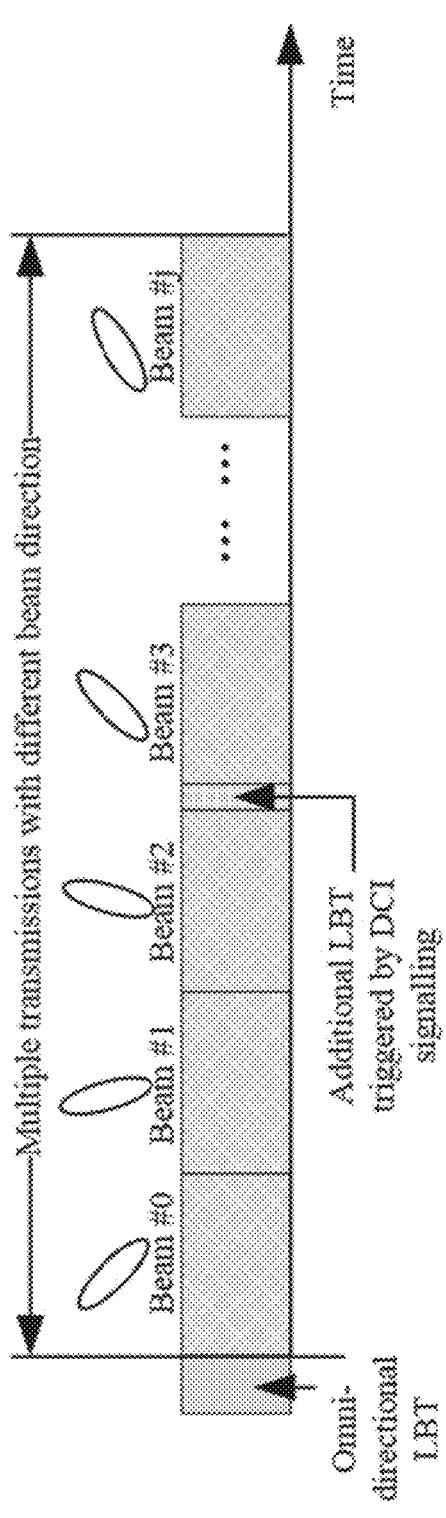
FIG. 13 shows an additional LBT applied based on the DCI signaling trigger.

FIG. 13 shows an additional LBT applied based on the DCI signaling trigger.

Here, an omni-directional LBT is taken as an example to illustrate DCI trigger an additional LBT operation, as shown in FIG. 13.

If the node receives such a DCI signaling, then the node needs to perform an additional LBT. Otherwise, if DCI signaling is not received, then the node continue transmission.

In some implementations, LBT mode corresponding to additional LBT can be pre-defined configuration, or DCI signaling indication. Further, DCI signaling can indicate at least one of LBT mode, LBT type, the resource for LBT operation, beam mode for LBT, beam direction/index for LBT.

Embodiment 7

This embodiment will mainly introduce one switching point for channel occupancy time sharing case.

Figure 14:
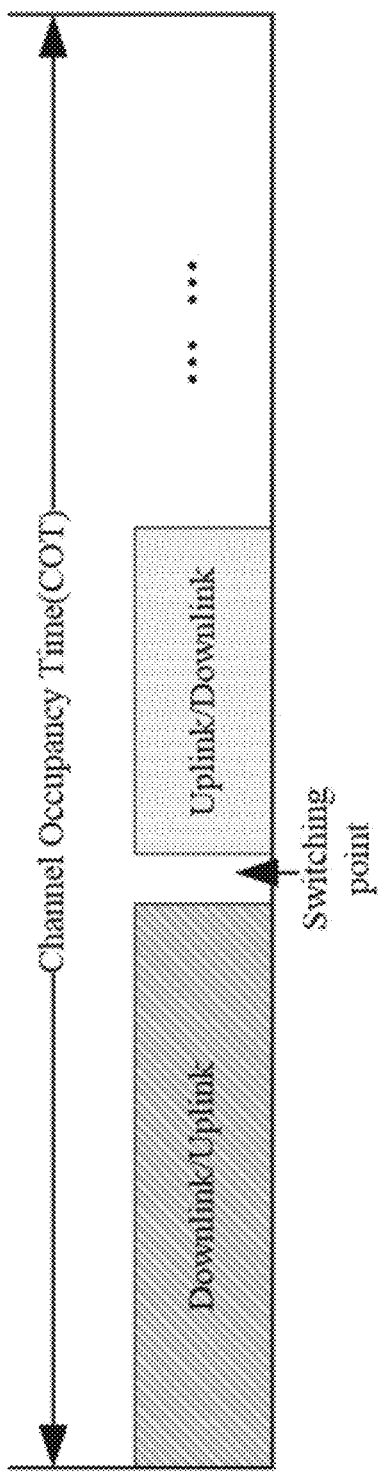
FIG. 14. shows a switching point for COT sharing case.

FIG. 14. shows a switching point for COT sharing case.

As shown in FIG. 14, for a switching point between DL and UL, or, UL and DL, the node (e.g., base station or UE) can perform an LBT operation before DL or UL transmission. In some implementations, the LBT operation can include at least one of LBT mode, LBT mechanism, beam pattern/index for LBT operation, the operation equivalent to the above. Further, whether to need an LBT operation is related to the gap length between DL and UL, or, UL and DL, and/or, whether there is a DCI signaling or UCI indication, and/or, whether transmission is located in a protected time interval/COT sharing/beam coverage range.

Case 1: the LBT operation is up to the gap length between DL and UL, or, UL and DL.

If the gap between DL and UL, or, UL and DL is up to the first value, then the node can transmit UL or DL transmission without performing any LBT operation.

If the gap between DL and UL, or, UL and DL is equal to the first value, or, larger than the first value and lower than the second value, or larger than the second value, or equal to the second value, then the node can perform a directional LBT before transmission.

If the gap between DL and UL, or, UL and DL is equal to the first value, or, larger than the first value and lower than the second value, or larger than the second value, or equal to the second value, and combined with some additional information, the node can transmit UL or DL transmission without performing any LBT operation. In some implementations, additional information includes the measurement and/or report result, and/or DCI indication information, and/or, exchange information.

In some implementations, the first value can be at least one of the following: 1 us, 2 us, 3 us, 4 us, 0.5, the any combination value of the above value. The second value can be at least one of the following: 5 us, 6 us, 7 us, 8 us, 9 us, 0.5 us, the any combination value of the above value.

Case 2: LBT operation is up to the indication of DCI signaling, or based on UCI information.

If DCI or UCI indicates at least one of an LBT mechanism, LBT mode, beam index or beam pattern, protected time interval/COT sharing/beam coverage range, then the node can perform or not perform LBT operation based on DCI indication or UCI information.

In some implementations, if DCI or UCI does not indicate that the transmission is in a protected time interval/COT sharing/beam coverage range, then the node needs to perform LBT operation based on a predefined manner or DCI signaling or UCI indication.

If the node knows transmission is within a protected time interval, the node can perform LBT operation at the starting point of the protected time interval based on the DCI or UCI information or predefined, or the node cannot perform LBT operation before transmission. If the node receives the indication of performing LBT operation according to DCI or UCI information, the node can ignore the received DCI or UCI information.

For UE side, if LBT operation is indicated to UE by DCI signaling or determined by a default manner, UE can select an LBT operation between an indicated manner or a default manner. Here, the default manner can be an LBT operation determined by UE itself or a default configuration.

In some implementations of the disclosed technology, at least one of LBT mechanism, LBT mode, beam index, beam pattern can be separately encoded, or jointly encoded. In some implementations, LBT mechanism includes at least one of the following: No LBT, Cat2 LBT with duration D1, Cat2 LBT with duration D2, multiple Cat2 LBT with duration D1, multiple Cat2 LBT with duration D2, Cat 4 LBT, enhanced Cat4 LBT. LBT mode includes at least one of the following: omni-directional LBT, single-beam directional LBT, multiple-beam directional LBT, wider beam based LBT. Optionally, the number of performing Cat2 LBT can be configured by DCI/UCI, and/or, RRC signaling, and/or pre-defined.

Further, the beam width and/or direction can be determined by the node itself or base station configuration or implementation.

Embodiment 8

The disclosed technology can be used in some embodiments to determine multiple switching points for a channel occupancy time sharing case.

Some embodiments can be applied to the base station initiated COT sharing with UE.

For the first switching point, if UE fails to access channel, then the current COT occupied by the base station will be lost or end in advance. This will not be helpful to keep the obtained channel occupancy time and improve the resource utilization. Thus, in the first switching point, no LBT or Cat2 LBT with short duration and directional LBT can be applied before UL transmission. In some implementations, beam direction and/or beam width is the same as that of the first transmission or first M transmission.

For example, it is assumed that UE1 and UE2 are scheduled or configured in the different time domain resources, respectively (e.g., the UE1 is in front of the UE2). In order to avoid losing the channel, UE1 cannot perform LBT operation and transmit a transmission. Further, if a gap between DL and UL is smaller than or equal to the first value, then no LBT can be used for UE1. For UE2, in some implementations, UE2 can perform a simplified/enhanced directional LBT, e.g., one or more beam directions and Cat2 LBT mechanism, or UE2 cannot perform LBT operation or can perform a "No LBT" operation.

For the second switching point, what type of LBT should be used for the base station transmission is determined. The base station can perform No LBT or one or more Cat2 LBT mechanism. This Cat2 LBT can be a single beam directional Cat2 LBT, or multiple beam directional Cat2 LBT, or wide beam directional LBT, thereby improving the probability of channel access.

In some implementations, the above methods can be applied to the next switching point, if any, and the UE initiated COT sharing with the base station. For the first switching point, No LBT or one or more single beam directional Cat2 LBT or multiple beam directional Cat2 LBT or wide beam directional Cat2 LBT can be applied before DL transmission. The second switching point, No LBT or one or multiple beam directional Cat2 LBT can be applied before UL transmission.

Embodiment 9

This embodiment mainly provides some handling methods on transmission or LBT failure.

If the node fails to access a channel before transmission or reception failure occurs for the target node, or if the transmission for the node is not received successfully, or for re-transmission or transmission failure cases, then at least one of the following method can be considered:

Method 1: change at least one of the following: LBT mechanism, LBT mode, beam direction for LBT, or use the same LBT operation as the previous transmission. Change is based on at least one of the following: signaling information indication, or timer expires or the ending point of time interval and/or the capability of the node, or based on the event triggering. Wherein, event triggering includes at least one of statistics value in a certain time, or success/failure times for LBT or transmission or reception and so on.

In some implementations, before transmission or re-transmission, the node can apply at least one of directional listen-before-talk (LBT), omni directional LBT, wide directional beam LBT, multiple directional LBT, no LBT, Cat 4 LBT, Cat2 LBT, or multiple Cat 2 LBT.

In some implementations, the listen-before-talk mechanism includes at least one of no LBT, Cat 4 LBT, enhanced Cat4 LBT, Cat2 LBT, or multiple Cat 2 LBT.

In some implementations, the listen-before-talk mode includes at least one of directional LBT, omni directional LBT, wide directional beam LBT, or multiple directional LBT.

For one or multiple transmissions, if the node fails to access a channel or reception failure occurs for the target node, then it can try to transmit or perform a channel access in the next transmission opportunities. Here, LBT operation to perform channel access can be the same as or different from the previous transmission, e.g., LBT mechanism, LBT mode, beam direction.

For example, assumed that the node use No LBT to transmit transmission. If the node receives a signaling/event trigger, then it needs to operate based on the triggering signaling/event, e.g., perform an LBT operation. Optionally, LBT operation includes at least one of directional listen-before-talk (LBT), omni directional LBT, wide directional beam LBT, multiple directional LBT, no LBT, Cat 4 LBT, enhanced Cat4 LBT, Cat2 LBT, or multiple Cat 2 LBT, beam direction for LBT. Optionally, the event trigger includes at least one of statistics value in a certain time, or success/failure times for LBT or transmission or reception. For example, in the previous transmission, Cat4 LBT mechanism and directional LBT or No LBT is used and failed. Then, in the next transmission opportunity, at least one of LBT mechanism, LBT mode, beam direction can be changed. E.g., LBT mechanism remains unchanged, and multiple beam directional LBTs can be used, or LBT mechanism and LBT mode remain unchanged, and the beam direction is changed. These methods are shown in the following tables. The disclosed technology can be used to provide any combination of at least one of LBT mechanism, LBT mode, or beam direction. If the node perform No LBT operation, that is to say, directly transmit a transmission without assessment channel states, and if the target node cannot receive the information from the transmitting node or the transmitting node receives signaling information indication, or when timer expires or the ending point of time interval and/or the capability of the node, or based on the event triggering (such as, statistics value in a certain time, or success/failure times for LBT or transmission or reception, other cases, and so on), then the transmitting node can perform at least one of directional listen-before-talk (LBT), omni directional LBT, wide directional beam LBT, multiple directional LBT, no LBT, Cat 4 LBT, enhanced Cat4 LBT, Cat2 LBT, or multiple Cat 2 LBT, beam direction for LBT. Preferably, perform Cat2 LBT or multiple Cat2 LBT with directional LBT, or multiple beam based directional LBT. Some special examples are listed below Table 3-11.

TABLE 3

| | LBT mechanism | LBT mode | beam direction for LBT (optional) |
|---|---|---|---|
| For Previous transmission | | | |
| | Cat4 LBT | Directional LBT | Beam direction #A |
| For the next transmission | Cat4 LBT | Directional LBT | Beam direction #A |
| | Cat4 LBT | Directional LBT | Change beam direction |
| | Cat4 LBT | Multiple beam based Directional LBT | / |
| | Cat2 LBT | Directional LBT | Beam direction #A |
| | Cat2 LBT | Directional LBT | Change beam direction |
| | Cat2 LBT | Multiple beam based Directional LBT | / |
| | Multiple Cat2 LBT | Directional LBT | Beam direction #A |
| | Multiple Cat2 LBT | Directional LBT | Change beam direction |
| | Multiple Cat2 LBT | Multiple beam based Directional LBT | / |
| | No LBT | | |

| | LBT mechanism | LBT mode | beam direction for LBT (optional) | Notes |
|---|---|---|---|---|
| For Previous transmission | | | | |
| | Cat4 LBT | Multiple beam based Directional LBT | / | Only transmission in LBT successful beam direction, if exist the beam of LBT success; |
| For the next transmission | Cat4 LBT | Multiple beam based Directional LBT | | |
| | Cat4 LBT | Multiple beam based Directional LBT | No limit | Change or unchange beam direction |
| | Cat4 LBT | Directional LBT | No limit | One of the subsequent transmission direction, or the next transmission direction, or any one of multiple beam direction for LBT |
| | Cat2 LBT/ multiple Cat2 LBT | Multiple beam based Directional LBT | No limit | Change or unchange beam direction |

-continued

| | LBT mechanism | LBT mode | beam direction for LBT | Notes |
|---|---|---|---|---|
| | Cat2 LBT/ multiple Cat2 LBT | Directional LBT | No limit | One of the subsequent transmission direction, or the next transmission direction, or any one of multiple beam direction for LBT |
| | No LBT | | | |

TABLE 5

| For Previous transmission / For the next transmission | LBT mechanism | LBT mode | beam direction for LBT (optional) | Notes |
|---|---|---|---|---|
| For Previous transmission | Cat4 LBT | Wider beam based LBT | Beam direction #AA | |
| For the next transmission | Cat4 LBT | Wider beam based LBT | Beam direction #AA | |
| | Cat4 LBT | Multiple beam based Directional LBT | | the subsequent transmission direction |
| | Cat4 LBT | Directional LBT | | One of the subsequent transmission direction, or the next transmission direction, or any one of multiple beam direction for LBT |
| | Cat2 LBT/ multiple Cat2 LBT | Wider beam based LBT | Beam direction #AA | |
| | Cat2 LBT/ multiple Cat2 LBT | Multiple beam based Directional LBT | | the subsequent transmission direction |
| | Cat2 LBT/ multiple Cat2 LBT | Directional LBT | | One of the subsequent transmission direction, or the next transmission direction, or any one of multiple beam direction for LBT |
| | NoLBT | | | |

TABLE 6

| For Previous transmission / For the next transmission | LBT mechanism | LBT mode | beam direction for LBT (optional) |
|---|---|---|---|
| For Previous transmission | Cat2 LBT | Directional LBT | Beam direction #A |
| For the next transmission | Cat2 LBT | Directional LBT | Beam direction #A |
| | multiple Cat2 LBT | Directional LBT | Beam direction #A |
| | Cat2 LBT/ multiple Cat2 LBT | Directional LBT | Change beam direction |

TABLE 6-continued

| | LBT mechanism | LBT mode | beam direction for LBT |
|---|---|---|---|
| | Cat2 LBT/ multiple Cat2 LBT | Multiple beam based Directional LBT | / |
| | No LBT | | |

TABLE 7

| For Previous transmission / For the next transmission | LBT mechanism | LBT mode | beam direction for LBT (optional) | Notes |
|---|---|---|---|---|
| | Cat2 LBT | Multiple beam based Directional LBT | / | Only transmission in LBT successful beam direction, if exist the beam of LBT success; |
| For the next transmission | Cat2 LBT | Multiple beam based Directional LBT | | |
| | Cat2 LBT/ multiple Cat2 LBT | Multiple beam based Directional LBT | Change or unchange beam direction | |
| | Cat2 LBT/ multiple Cat2 LBT | Directional LBT | No limit | One of the subsequent transmission direction, or the next transmission direction, or any one of multiple beam direction for LBT |
| | NoLBT | | | |

TABLE 8

| For Previous transmission / For the next transmission | LBT mechanism | LBT mode | beam direction for LBT (optional) | Notes |
|---|---|---|---|---|
| | Cat2 LBT | Wider beam based LBT | Beam direction #AA | |
| For the next transmission | Cat2 LBT | Wider beam based LBT | Beam direction #AA | |
| | Cat2 LBT/ multiple Cat2 LBT | Multiple beam based Directional LBT | | the subsequent transmission direction |
| | Cat2 LBT/ multiple Cat2 LBT | Directional LBT | | One of the subsequent transmission direction, or the next transmission direction, or any one of multiple beam direction for LBT |
| | NoLBT | | | |

TaBLE 9

| For Previous transmission | LBT mechanism | LBT mode | beam direction for LBT (optional) |
|---|---|---|---|
| | multiple Cat2 LBT | Directional LBT | Beam direction #A |
| For the next transmission | multiple Cat2 LBT | Directional LBT | Beam direction #A |
| | Cat2 LBT/ multiple Cat2 LBT | Directional LBT | Change beam direction |
| | Cat2 LBT/ multiple Cat2 LBT | Multiple beam based Directional LBT | / |
| | No LBT | | |

TABLE 10

| For Previous transmission | LBT mechanism | LBT mode | beam direction for LBT (optional) | Notes |
|---|---|---|---|---|
| | multiple Cat2 LBT | Multiple beam based Directional LBT | / | Only transmission in LBT successful beam direction, if exist the beam of LBT success; |
| For the next transmission | multiple Cat2 LBT | Multiple beam based Directional LBT | | |
| | multiple Cat2 LBT | Multiple beam based Directional LBT | Change or unchange beam direction | |
| | Cat2 LBT/ multiple Cat2 LBT | Directional LBT | No limit | One of the subsequent transmission direction, or the next transmission direction, or any one of multiple beam direction for LBT |
| | NoLBT | | | |

TABLE 11

| For Previous transmission | LBT mechanism | LBT mode | beam direction for LBT (optional) | Notes |
|---|---|---|---|---|
| | multiple Cat2 LBT | Wider beam based LBT | Beam direction #AA | |
| For the next transmission | multiple Cat2 LBT | Wider beam based LBT | Beam direction #AA | |
| | Cat2 LBT/ multiple Cat2 LBT | Multiple beam based Directional LBT | | the subsequent transmission direction |
| | Cat2 LBT/ multiple Cat2 LBT | Directional LBT | | One of the subsequent transmission direction, or the next transmission direction, or any one of multiple beam direction for LBT |
| | NoLBT | | | |

Method 2: Reduce transmitting power.

For example, if the node assess the current channel as busy, then it can be allowed to transmit with degrading transmission power from P1 to P2. in some implementations, P1>P2. P2 is an appropriate power for coexistence. or, P2 is determined by an offset.

Method 3: Upgrade CCA detection threshold.

For example, if the node assess the current channel as busy, and the received energy is lower than a certain CCA threshold, then the current channel can be regarded as idle.

For the multiple transmission(s), the node can transmit a transmission after obtaining the right of accessing channel according to LBT information by at least one of pre-defined manner, RRC signaling configuration manner, DCI signaling configuration manner. In some implementations, LBT information includes at least one of LBT mode, LBT mechanism, beam direction, beam width, time resource corresponding to LBT operation, frequency resource corresponding to LBT operation.

Embodiment 10

In this embodiment, a method is provided to design LBT for the case of channel occupancy time (COT) sharing with other node(s). Here, the node that initiates a channel occupancy time (COT) can be User Equipment (UE), or Base Station (BS). The node that shares a channel occupancy time (COT) initiated by the other node can also be User Equipment (UE), or Base Station (BS).

For a channel occupancy time sharing case, as shown in Table 12, the rule of LBT design can follow one of the following.

Case 1: When it is outside the channel occupancy time (COT) window or before the starting point of the channel occupancy time (COT), the node performs the channel access using omni-directional LBT. When it is inside the COT, the node performs channel access using omni-directional LBT.

Case 2: When it is outside the channel occupancy time (COT) window or before the starting point of the channel occupancy time (COT), the node performs the channel access using omni-directional LBT. When it is inside the COT, the node performs channel access using directional LBT.

Case 3: When it is outside the channel occupancy time (COT) window or before the starting point of the channel occupancy time (COT), the node performs channel access using omni-directional LBT. When it is inside the COT, the node transmits a transmission without performing LBT (i.e. No LBT).

Case 4: When it is outside the channel occupancy time (COT) window or before the starting point of the channel occupancy time (COT), the node performs channel access using directional LBT. When it is inside the COT, the node performs channel access using omni-directional LBT.

Case 5: When it is outside the channel occupancy time (COT) window or before the starting point of the channel occupancy time (COT), the node performs channel access using directional LBT. When it is inside the COT, the node performs channel access using directional LBT.

Case 6: When it is outside the channel occupancy time (COT) window or before the starting point of the channel occupancy time (COT), the node performs channel access using directional LBT. When it is inside the COT, the node transmits a transmission without performing LBT (i.e. No LBT).

Case 7: When it is outside the channel occupancy time (COT) window or before the starting point of the channel occupancy time (COT), the node transmits a transmission without performing LBT (i.e. No LBT). When it is inside the COT, the node performs channel access using omni-directional LBT.

Case 8: When it is outside the channel occupancy time (COT) window or before the starting point of the channel occupancy time (COT), the node transmits a transmission without performing LBT (i.e. No LBT). When it is inside the COT, the node performs channel access using directional LBT.

Case 9: When it is outside the channel occupancy time (COT) window or before the starting point of the channel occupancy time (COT), the node transmits a transmission without performing LBT (i.e. No LBT). When it is inside the COT, the node transmits a transmission without performing LBT (i.e. No LBT).

TABLE 12 the rule of LBT design for Channel occupancy time sharing case

| LBT mode | Outside/starting of COT | Inside of COT |
| --- | --- | --- |
| Case-1 | omni-directional LBT | omni-directional LBT |
| Case-2 | omni-directional LBT | directional LBT |
| Case-3 | omni-directional LBT | No LBT |
| Case-4 | directional LBT | omni-directional LBT |
| Case-5 | directional LBT | directional LBT |
| Case-6 | directional LBT | No LBT |
| Case-7 | No LBT | omni-directional LBT |
| Case-8 | No LBT | directional LBT |
| Case-9 | No LBT | No LBT |

The embodiments discussed in this patent document can apply the above rules of LBT in the COT sharing case.

In some implementations of the disclosed technology, CCA energy detection (ED) is based on at least one of the transmission beam and the received beam. In some implementations.

When CCA ED is based on "the transmission beam" or "the received beam," different transmission/reception beam modes for transmission/reception beams are related to different CCA detection thresholds. Further, CCA threshold is a function of beam angle and/or beam width. When a mismatch between CCA energy detection (ED) beam and transmission beam happens, the new CCA threshold is defined, or double CCA thresholds are set, and for example, normal CCA detection threshold and new introduced CCA detection threshold are set.

When CCA ED is based on "the transmission beam" and "the received beam," only one CCA detection threshold is set, and in some implementations, the principle of determining channel idle includes as long as the detected energy in at least one of transmission beam and the reception beam is lower than or equal to the CCA detection threshold.

The double CCA detection thresholds are set, and in some implementations, the principle of determining channel idle includes the difference in the detected energy between transmission beam and the reception beam is lower than or equal to the 2rd set CCA threshold; or at least one of energy detected in the transmission beam and the reception beam is lower than or equal to the 2rd set CCA threshold.

In some implementations of the disclosed technology, the maintenance of channel occupancy time (COT) for different beam direction transmission can be determined by at least one of the following: common channel occupancy time is maintained for each beam direction; channel occupancy time is maintained independently for each beam direction; channel occupancy time is maintained independently for each beam direction and each channel occupancy time is related to the transmission time corresponding to the beam direction; channel occupancy time is maintained independently for some beam direction and each channel occupancy time is related to the transmission time corresponding to some beam direction.

In some implementations of the disclosed technology, the method of channel occupancy for multiple transmissions with directional beams, includes: once the node starts transmitting a transmission with beam direction, then this beam direction will be keeping transmission until link direction switching; or the node transmits a transmission with multiple beam directions and the beam directions for the previous transmission contain all beam directions for the subsequent transmission; for the first M beam directions, for the remaining of N-M beam directions, the node transmits a transmission with M or N-M beam directions and the beam directions for the previous transmission contain all beam directions for the subsequent transmission.

In some implementations of the disclosed technology, LBT rule for multiple transmission(s) with directional beams, includes: before the first transmission, multiple beam based LBT can be applied if configured, if LBT success, the node can send indication information, e.g., available/unavailable beam indication, channel occupancy time for beam direction, beam switching information, the combination of the above; before the first transmission, wider beam based LBT can be applied if configured, optionally, if the wider beam range corresponding to the LBT successful does not totally cover all transmission direction, then an additional LBT can be introduced; a time interval or timer is defined, and within the time interval or timer, the node does not need to perform LBT operation. Outside time interval or timer, an additional LBT is introduced; and once LBT succeeds, the node does not need to perform LBT operation during transmission unless it received signaling/event trigger.

In some implementations of the disclosed technology, LBT rule of Switching points for COT sharing, includes: LBT operation is up to the gap length between DL and UL, or, UL and DL; LBT operation is up to the indication of DCI signaling, or based on UCI information, for UE side, when LBT operation is indicated by DCI signaling, UE can select a LBT operation between an indicated manner or a default manner. Here, the default manner can be an LBT operation determined by UE itself or a default configuration and No LBT or Cat2 LBT with short duration and directional LBT can be applied.

In some implementations of the disclosed technology, methods for handling LBT failures include: changing at least one of LBT mechanism, LBT mode, beam direction for LBT; using the same LBT operation as the previous transmission; and reducing the transmission power; and updating the CCA detection threshold.

FIG. 15 shows an example of a data communication method based on some example embodiments of the disclosed technology.

In some embodiments of the disclosed technology, a data communication method 1500 includes, at 1510, detecting an idle channel by performing, by a communication node, an energy detection operation based on at least one of a transmission beam or a reception beam, and at 1520, transmitting, upon detection of the idle channel in at least one of the transmission beam or the reception beam, messages through the transmission beam corresponding to the idle channel.

Figure 16:
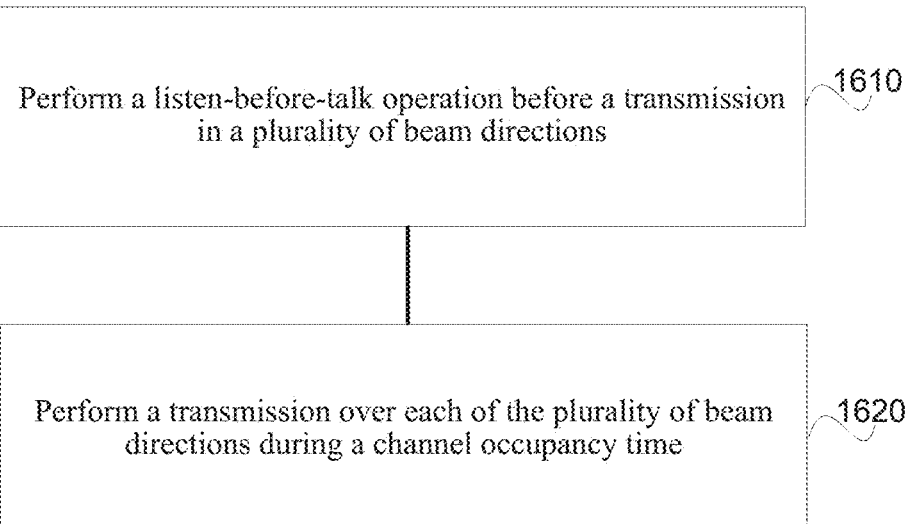
FIG. 16 shows another example of a data communication method based on some example embodiments of the disclosed technology.

FIG. 16 shows another example of a data communication method based on some example embodiments of the disclosed technology.

In some embodiments of the disclosed technology, a data communication method 1600 includes, at 1610, performing a listen-before-talk operation before a transmission in a plurality of beam directions, and at 1620, performing a transmission over each of the plurality of beam directions during a channel occupancy time.

FIG. 17 shows another example of a data communication method based on some example embodiments of the disclosed technology.

In some embodiments of the disclosed technology, a data communication method 1700 includes, at 1710, performing one or more transmissions through one or more transmission channels by occupying one or more beam directions.

Figure 18:
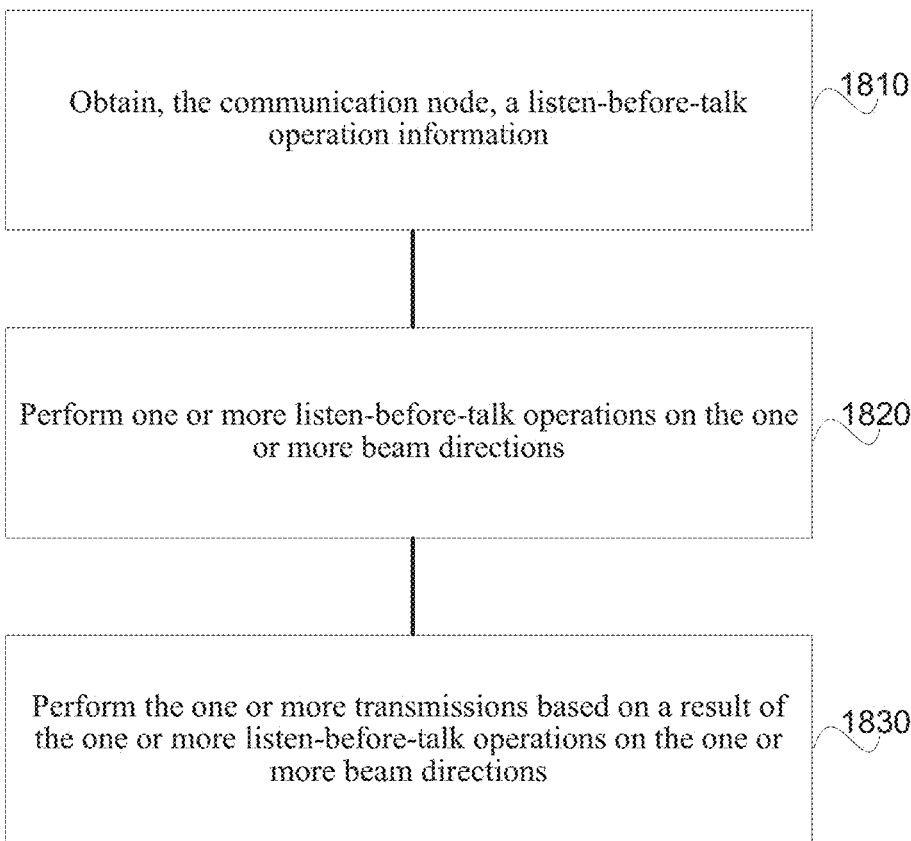
FIG. 18 shows another example of a data communication method based on some example embodiments of the disclosed technology.

FIG. 18 shows another example of a data communication method based on some example embodiments of the disclosed technology.

In some embodiments of the disclosed technology, a data communication method 1800 includes, at 1810, obtaining, the communication node, a listen-before-talk operation information, at 1820, performing one or more listen-before-talk operations on the one or more beam directions, and at 1830, performing the one or more transmissions based on a result of the one or more listen-before-talk operations on the one or more beam directions.

FIG. 19 shows another example of a data communication method based on some example embodiments of the disclosed technology.

In some embodiments of the disclosed technology, a data communication method 1900 includes, at 1910, determining a switching window between a downlink transmission and an uplink transmission within a channel occupancy time, and at 1920, performing, upon determination that the switching window is longer than or equal to a predetermined time duration, a listen-before-talk operation at a time within the switching window.

FIG. 20 shows another example of a data communication method based on some example embodiments of the disclosed technology.

In some embodiments of the disclosed technology, a data communication method 2000 includes, at 2010, performing a transmission or a listen-before-talk operation before a transmission, and at 2020, making, upon determination that a reception or the listen-before-talk operation has failed, a change to at least one of a listen-before-talk mechanism, a listen-before-talk mode, a beam direction for a listen-before-talk procedure.

Figure 21:
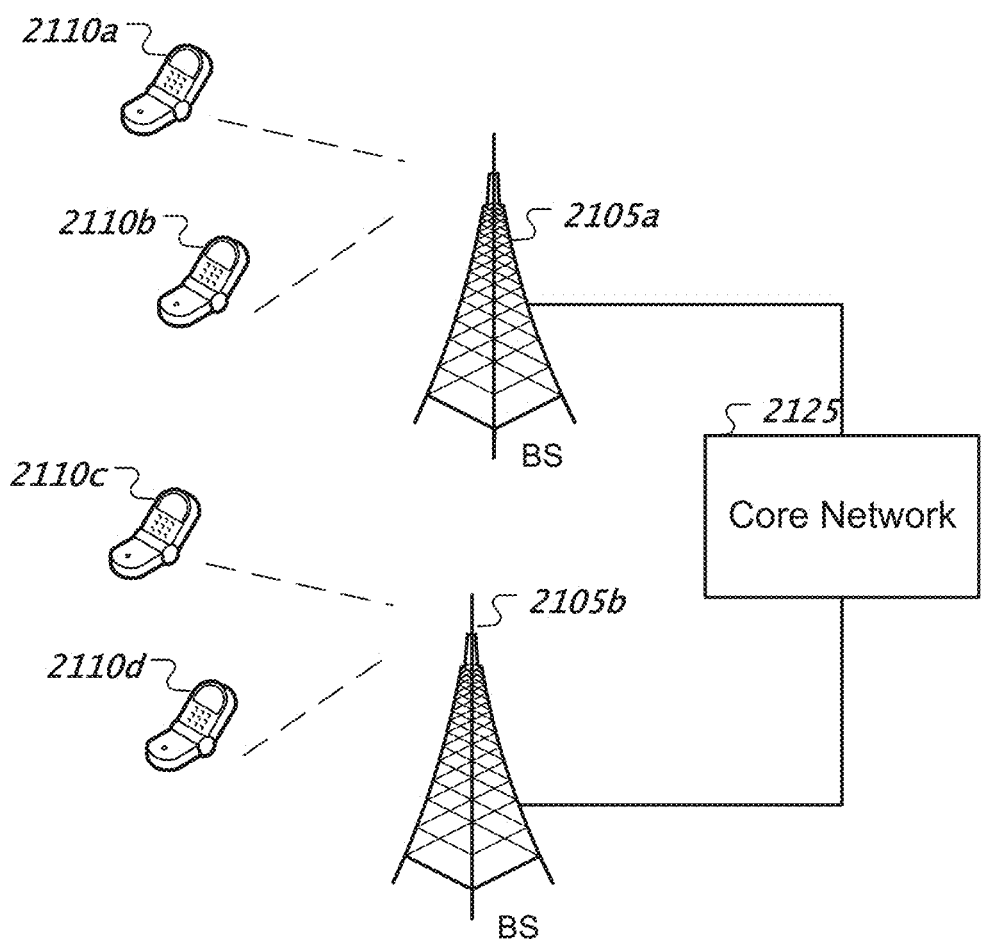
FIG. 21 shows an example of a wireless communication system where techniques in accordance with one or more embodiments of the present technology can be applied.

FIG. 21 shows an example of a wireless communication system 2100 where techniques in accordance with one or more embodiments of the present technology can be applied. A wireless communication system 2100 can include one or more base stations (BSs) 2105a, 2105b, one or more wireless devices 2110a, 2110b, 2110c, 2110d, and a core network 2125. A base station 2105a, 2105b can provide wireless service to wireless devices 2110a, 2110b, 2110c and 2110d in one or more wireless sectors. In some implementations, a base station 2105a, 2105b includes directional antennas to produce two or more directional beams to provide wireless coverage in different sectors.

The core network 2125 can communicate with one or more base stations 2005a, 2105b. The core network 2125 provides connectivity with other wireless communication systems and wired communication systems. The core network may include one or more service subscription databases to store information related to the subscribed wireless devices 2110a, 2110b, 2110c, and 2110d. A first base station 2105a can provide wireless service based on a first radio access technology, whereas a second base station 2105b can provide wireless service based on a second radio access technology. The base stations 2105a and 2105b may be co-located or may be separately installed in the field according to the deployment scenario. The wireless devices 2110a, 2110b, 2110c, and 2110d can support multiple different radio access technologies. The techniques and embodiments described in the present document may be implemented by the base stations of wireless devices described in the present document.

Figure 22:
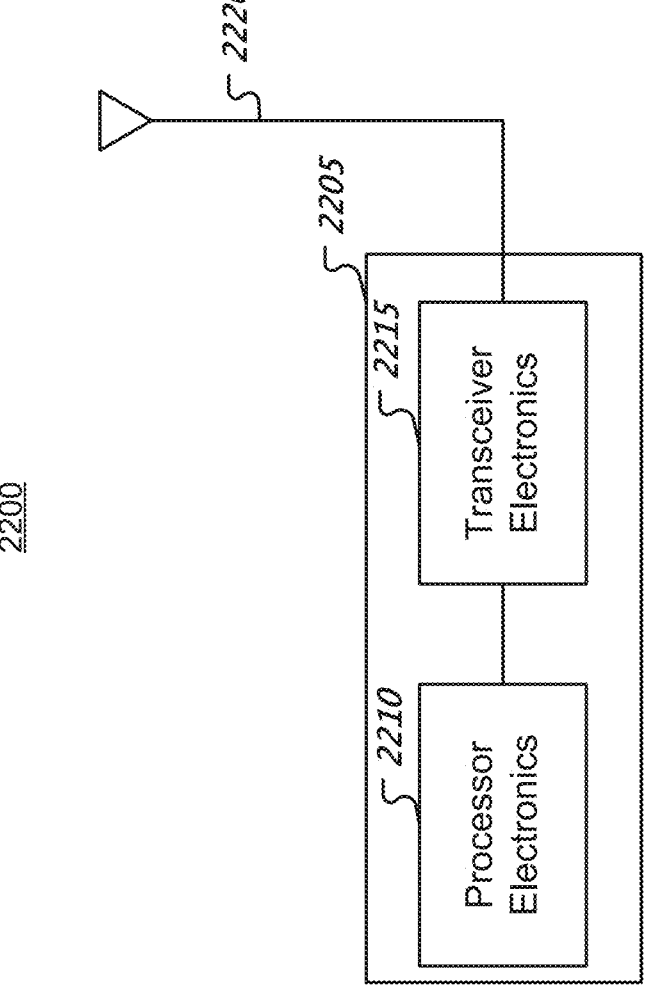
FIG. 22 is a block diagram representation of a portion of a radio station in accordance with one or more embodiments of the present technology can be applied.

FIG. 22 is a block diagram representation of a portion of a radio station in accordance with one or more embodiments of the present technology can be applied. A radio 2205 such as a base station or a wireless device (or UE) can include processor electronics 2210 such as a microprocessor that implements one or more of the wireless techniques presented in this document. The radio 2205 can include transceiver electronics 2215 to send and/or receive wireless signals over one or more communication interfaces such as antenna 2220. The radio 2205 can include other communication interfaces for transmitting and receiving data. Radio 2205 can include one or more memories (not explicitly shown) configured to store information such as data and/or instructions. In some implementations, the processor electronics 2210 can include at least a portion of the transceiver electronics 2215. In some embodiments, at least some of the disclosed techniques, modules or functions are implemented using the radio 2205. In some embodiments, the radio 2205 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: receiving, by a mobile device, detecting an idle channel by performing, by a communication node, an energy detection operation based on at least one of a transmission beam or a reception beam, and transmitting, upon detection of the idle channel in at least one of the transmission beam or the reception beam, messages through the transmission beam corresponding to the idle channel.

Clause 2. The method of clause 1, wherein the energy detection operation is performed based on one or more detection thresholds.

Clause 3. The method of clause 2, wherein the one or more detection thresholds are determined based on a mode of at least one of the transmission beam or the reception beam Clause 4. The method of any of clauses 1-3, wherein the one or more detection thresholds are a function of at least one of a beam angle and a beam width.

Clause 5. The method of any of clauses 1-3, wherein one or more detection thresholds are updated or determined based on whether there is a mismatch between a clear channel assessment energy detection beam and the transmission beam.

Clause 6. The method of any of clauses 1-3, wherein the mode includes at least one of a directional beam mode, a wide directional beam mode, or an omni directional beam mode, or a multiple directional beam mode.

Clause 7. The method of any of clauses 1-6, wherein, upon detection that the energy detected is lower than or equal to the detection threshold, the corresponding channel is determined as idle, and upon detection that the energy detected is larger the detection threshold, the corresponding channel is determined as busy.

Clause 8. The method of clause 2, wherein the energy detection operation is performed based on the one or more detection thresholds such that, if the detected energy in at least one of the transmission beam and the reception beam is lower than or equal to a first detection threshold, a channel corresponding to the transmission beam is determined as idle.

Clause 9. The method of clause 2, wherein the energy detection operation is performed based on the one or more detection thresholds such that, if the energy detection operation in at least one of the transmission beam and the reception beam is lower than a first detection threshold, and a difference in a detected energy between the transmission beam and the reception beam is lower than or equal to a second detection threshold, a channel corresponding to the transmission beam is determined as idle.

Clause 10. The method of clause 2, wherein the energy detection operation is performed based on the one or more detection thresholds such that, if the energy detection operation in at least one of the transmission beam and the reception beam is larger than or equal to a first detection threshold, and lower than or equal to a second detection threshold, a channel corresponding to the transmission beam is determined as idle.

Clause 11. The method of clause 1, further comprising, making, upon failing to detect any idle channel in at least one of the transmission beam or the reception beam, a change to at least one of a listen-before-talk mechanism, a listen-before-talk mode, a beam direction for a listen-before-talk procedure.

Clause 12. A data communication method, comprising: performing a listen-before-talk operation before a transmission in a plurality of beam directions; and performing a transmission over each of the plurality of beam directions during a channel occupancy time.

Clause 13. The method of clause 12, wherein the plurality of beam directions has a common channel occupancy time.

Clause 14. The method of clause 13, wherein the common channel occupancy time is determined based on a first listen-before-talk operation that has been performed successfully.

Clause 15. The method of any of clauses 12 or 14, wherein the listen-before-talk operation includes at least one of directional listen-before-talk (LBT), omni directional LBT, wide directional beam LBT, multiple directional LBT, no LBT, Cat 4 LBT, Cat2 LBT, or multiple Cat 2 LBT.

Clause 16. The method of clause 12, wherein each of the plurality of beam directions has a channel occupancy time maintained independently from each other.

Clause 17. The method of clause 16, wherein each channel occupancy time corresponding to each of the plurality of beam directions is determined based on a time it takes to complete a transmission over a channel of a corresponding beam direction.

Clause 18. The method of clause 12, wherein the plurality of beam directions is grouped into a plurality of beam direction groups, and each beam direction group has a channel occupancy time maintained independently from each other.

Clause 19. The method of clause 18, wherein each channel occupancy time corresponding to each of the plurality of beam direction groups is determined based on a time it takes to complete transmissions over channels in beam directions of a corresponding beam direction group.

Clause 20. A data communication method, comprising: performing one or more transmissions through one or more transmission channels by occupying one or more beam directions.

Clause 21. The method of clause 20, wherein the one or more beam directions remain occupied by the one or more transmissions until a link direction switching occurs or the one or more transmissions are completed or the one or more beam directions for transmission contain all beam directions corresponding to the current transmission and the subsequent transmission.

Clause 22. The method of any of clauses 20-21, further comprising performing at least one of directional listen-before-talk (LBT), omni directional LBT, wide directional beam LBT, multiple directional LBT, no LBT, Cat 4 LBT, Cat2 LBT, or multiple Cat 2 LBT.

Clause 23. The method of clause 20, wherein for first M beam directions of a total of N beam directions or N-M beam directions, beam directions for current beam directions including a beam corresponding to a current transmission and a beam corresponding to a subsequent transmission within the M beam directions or the N-M beam directions.

Clause 24. The method of clause 20, wherein each of the plurality of beam directions occupies a channel occupancy time different from each other.

Clause 25. A data communication method, comprising: obtaining, the communication node, a listen-before-talk operation information; performing one or more listen-before-talk operations on the one or more beam directions; and performing the one or more transmissions based on a result of the one or more listen-before-talk operations on the one or more beam directions.

Clause 26. The method of clause 25, further comprising transmitting, if the one or more listen-before-talk operations are performed successfully, an indication including at least one of an availability or unavailability of beam direction, a channel occupancy time for beam direction, or beam switching information.

Clause 27. The method of clause 25, wherein the one or more listen-before-talk operations include at least one of directional listen-before-talk (LBT), multiple directional LBT, or wide directional beam LBT, omni directional LBT, no LBT, Cat 4 LBT, Cat2 LBT, multiple Cat 2 LBT.

Clause 28. The method of clause 25, further comprising setting a time interval to continue the one or more transmissions during the time interval without performing an additional listen-before-talk operation.

Clause 29. The method of clause 28, wherein the time interval is configured by at least one of a radio resource control signaling, a downlink control information signaling, or is predefined.

Clause 30. The method of clause 28, wherein a granularity of the time interval is symbol-level, slot-level, sub-frame-level, or mini-slot-level.

Clause 31. The method of clause 25, further comprising an additional listen-before-talk procedure upon receiving a signaling message or upon an occurrence of a predetermined event or at an ending point of the time interval or when a timer expires.

Clause 32. A data communication method, comprising: determining a switching window between a downlink transmission and an uplink transmission within a channel occupancy time; and performing, upon determination that the switching window is longer than or equal to a predetermined time duration, a listen-before-talk operation at a time within the switching window.

Clause 33. The method of clause 32, further comprising performing a transmission without performing the listen-before-talk operation upon determination that the switching window is shorter than a predetermined time duration.

Clause 34. The method of clause 33, further comprising transmitting, to a mobile device, information associated with the transmission made without performing the listen-before-talk operation, wherein the information includes at least one of a channel measurement, a report result, uplink control information, or exchange information.

Clause 35. The method of clause 32, wherein the listen-before-talk operation is based on an indication of a downlink control information signaling or based on uplink control information.

Clause 36. The method of clause 35, wherein the indication includes at least one of listen-before-talk (LBT) mechanism, LBT mode, beam index, beam pattern, protected time interval, channel occupancy time sharing, or beam coverage range.

Clause 37. The method of clause 32, further comprising transmitting, to a mobile device, an indication of a downlink control information signaling such that the mobile device selects one of default listen-before-talk operation or a different listen-before-talk operation represented by the indication.

Clause 38. The method of clause 35, wherein the switching window includes a plurality of switching points.

Clause 39. The method of clause 38, wherein at a first switching point, among the plurality of switching points, at least one of an uplink transmission or a downlink transmission is made without performing the listen-before-talk operation, or by performing at least one of the listen-before-talk operation without back-off or one or more directional listen-before-talk operations before at least one of an uplink transmission or a downlink transmission.

Clause 40. The method of clause 38, wherein at a second switching point, among the plurality of switching points, at least one of a base station or user equipment performs a transmission without performing the listen-before-talk operation, or a single-beam-directional listen-before-talk operation without back-off, or multiple-beam-directional listen-before-talk operation without back-off.

Clause 41. A data communication method, comprising: performing a transmission or a listen-before-talk operation before a transmission; and making, upon determination that a reception or the listen-before-talk operation has failed, a change to at least one of a listen-before-talk mechanism, a listen-before-talk mode, a beam direction for a listen-before-talk procedure.

Clause 42. The method of clause 41, further comprising reducing a power of a transmission signal.

Clause 43. The method of clause 41, further comprising updating an energy detection threshold of a clear channel assessment.

Clause 44. The method of clause 41, wherein the listen-before-talk operation includes at least one of directional listen-before-talk (LBT), omni directional LBT, wide directional beam LBT, multiple directional LBT, no LBT, Cat 4 LBT, Cat2 LBT, or multiple Cat 2 LBT.

Clause 45. The method of clause 41, wherein the listen-before-talk mechanism includes at least one of no LBT, Cat 4 LBT, enhanced Cat4 LBT, Cat2 LBT, or multiple Cat 2 LBT.

Clause 46. The method of clause 41, wherein the listen-before-talk mode includes at least one of directional LBT, omni directional LBT, wide directional beam LBT, or multiple directional LBT.

Clause 47. An apparatus for wireless communication, comprising a memory and a processor, wherein the processor reads code from the memory and implements a method recited in any of clauses 1 to 46.

Clause 48. A computer readable program storage medium having code stored thereon, the code, when executed by a processor, causing the processor to implement a method recited in any of clauses 1 to 46.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A data communication method, comprising:
detecting an idle channel by performing, by a communication node, an energy detection operation based on a transmission beam and a reception beam; and
transmitting, upon detection of the idle channel in at least one of the transmission beam or the reception beam, messages through the transmission beam corresponding to the idle channel,
wherein the energy detection operation is performed by:
comparing a detected energy on the transmission beam with a first detection threshold; and comparing a detected energy on the reception beam with the first detection threshold, wherein, in a case that there is a difference between the detected energy on the transmission beam and the detected energy on the reception beam, the energy detection operation is performed by comparing the difference with a second detection threshold.

2. The method of claim 1, wherein the detection thresholds are determined based on a mode of at least one of the transmission beam or the reception beam, wherein the mode includes at least one of a directional beam mode, a wide directional beam mode, an omni directional beam mode, or a multiple directional beam mode.

3. A data communication method, comprising:
detecting an idle channel by performing, by a communication node, an energy detection operation based on at least one of a transmission beam or a reception beam, wherein the energy detection operation is performed using one or more detection thresholds; and
transmitting, upon detection of the idle channel in at least one of the transmission beam or the reception beam, messages through the transmission beam corresponding to the idle channel, wherein the one or more detection thresholds are updated or determined based on whether there is a mismatch between a clear channel assessment energy detection beam and the transmission beam.

4. The method of claim 1, wherein, upon detection that the detected energy on the transmission beam or the reception beam is lower than or equal to the first detection threshold, the corresponding channel is determined as idle, and upon detection that the detected energy on the transmission beam or the reception beam is larger than the first detection threshold, the corresponding channel is determined as busy.

5. The method of claim 1, wherein the energy detection operation is performed based on the first and second detection thresholds such that, if the detected energy on at least one of the transmission beam or the reception beam is lower than the first detection threshold, and a difference in a detected energy between the transmission beam and the reception beam is lower than or equal to the second detection threshold, a channel corresponding to the transmission beam is determined as idle.

6. The method of claim 1, wherein the energy detection operation is performed based on the first and second detection thresholds such that, if the detected energy on at least one of the transmission beam or the reception beam is larger than or equal to the first detection threshold, and lower than or equal to the second detection threshold, a channel corresponding to the transmission beam is determined as idle.

7. The method of claim 1, further comprising, making, upon failing to detect any idle channel in at least one of the transmission beam or the reception beam, a change to at least one of a listen-before-talk mechanism, a listen-before-talk mode, a beam direction for a listen-before-talk procedure.

8. The method of claim 1, wherein the first and second detection thresholds are updated or determined based on whether there is a mismatch between a clear channel assessment energy detection beam and the transmission beam.

9. An apparatus for wireless communication, comprising a memory and a processor, wherein the processor reads code from the memory and implements a method, comprising:

detecting an idle channel by performing, by a communication node, an energy detection operation based on a transmission beam and a reception beam; and transmitting, upon detection of the idle channel in at least one of the transmission beam or the reception beam, messages through the transmission beam corresponding to the idle channel, wherein the energy detection operation is performed by: comparing a detected energy on the transmission beam with a first detection threshold; and comparing a detected energy on the reception beam with the first detection threshold, wherein, in a case that there is a difference between the detected energy on the transmission beam and the detected energy on the reception beam, the energy detection operation is performed by comparing the difference with a second detection threshold.

10. The apparatus of claim 9, wherein the detection thresholds are determined based on a mode of at least one of the transmission beam or the reception beam, wherein the mode includes at least one of a directional beam mode, a wide directional beam mode, an omni directional beam mode, or a multiple directional beam mode.

11. The apparatus of claim 9, wherein the first and second detection thresholds are updated or determined based on whether there is a mismatch between a clear channel assessment energy detection beam and the transmission beam.

12. The apparatus of claim 9, wherein, upon detection that the detected energy on the transmission beam or the reception beam is lower than or equal to the first detection threshold, the corresponding channel is determined as idle, and upon detection that the detected energy on the transmission beam or the reception beam is larger than the first detection threshold, the corresponding channel is determined as busy.

13. The apparatus of claim 9, wherein the energy detection operation is performed based on the first and second detection thresholds such that, if the detected energy on at least one of the transmission beam or the reception beam is lower than the first detection threshold, and a difference in a detected energy between the transmission beam and the reception beam is lower than or equal to the second detection threshold, a channel corresponding to the transmission beam is determined as idle.

14. The apparatus of claim 9, wherein the energy detection operation is performed based on the first and second detection thresholds such that, if the detected energy on at least one of the transmission beam or the reception beam is larger than or equal to the first detection threshold, and lower than or equal to the second detection threshold, a channel corresponding to the transmission beam is determined as idle.

15. The apparatus of claim 9, where the method further comprises: making, upon failing to detect any idle channel in at least one of the transmission beam or the reception beam, a change to at least one of a listen-before-talk mechanism, a listen-before-talk mode, a beam direction for a listen-before-talk procedure.

* * * * *